US011743738B2

(12) United States Patent
Moreman et al.

(10) Patent No.: US 11,743,738 B2
(45) Date of Patent: Aug. 29, 2023

(54) EVALUATION OF ACCESS POINT PLACEMENT

(71) Applicant: Comcast Cable Communications, LLC, Philadelphia, PA (US)

(72) Inventors: Charles Stephens Moreman, Philadelphia, PA (US); Vamsi Potluru, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/810,356

(22) Filed: Mar. 5, 2020

(65) Prior Publication Data

US 2021/0282024 A1    Sep. 9, 2021

(51) Int. Cl.
| | |
|---|---|
| *H04W 12/06* | (2021.01) |
| *H04W 64/00* | (2009.01) |
| *H04W 16/18* | (2009.01) |
| *H04W 24/10* | (2009.01) |
| *H04W 24/02* | (2009.01) |

(52) U.S. Cl.
CPC .......... *H04W 16/18* (2013.01); *H04W 24/02* (2013.01); *H04W 24/10* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 7,054,627 B1 | 5/2006 | Hillman | |
| 7,069,024 B2 | 6/2006 | Sharony | |
| 7,406,116 B2 | 7/2008 | Agrawala et al. | |
| 7,574,492 B2 | 8/2009 | Karaoguz et al. | |
| 7,616,966 B2 | 11/2009 | Nguyen | |
| 8,112,098 B2 | 2/2012 | Karaoguz | |
| 8,744,352 B2 | 6/2014 | Pochop, Jr. | |
| 9,377,523 B2 | 6/2016 | Vandevoorde et al. | |
| 9,400,321 B2 | 7/2016 | Huang et al. | |
| 9,585,031 B2 | 2/2017 | Kadel et al. | |
| 9,693,194 B2 | 6/2017 | Pandey et al. | |
| 9,804,256 B2 | 10/2017 | Jamieson et al. | |
| 9,819,610 B1 * | 11/2017 | Crump | H04N 21/44218 |
| 9,823,330 B2 | 11/2017 | Hart et al. | |
| 9,888,360 B2 | 2/2018 | Sharma et al. | |
| 10,056,967 B2 | 8/2018 | Fan et al. | |

(Continued)

FOREIGN PATENT DOCUMENTS

| | | |
|---|---|---|
| CN | 102340868 A | 2/2012 |
| CN | 102421189 A | 4/2012 |

(Continued)

*Primary Examiner* — Gary Lafontant
(74) *Attorney, Agent, or Firm* — Banner & Witcoff, Ltd.

(57) ABSTRACT

Systems, apparatuses, and methods are described for providing remote evaluation of a placement of an access point relative to one or more wireless devices in communication with the access point in a wireless network. The access point may determine directions, relative to the access point, of signals associated with wireless communications received by the access point from the one or more wireless devices. An indication of whether to move access point may be provided. An indication of whether to install range extending computing devices may be determined based on evaluating a variety of wireless conditions associated with the wireless network.

29 Claims, 29 Drawing Sheets

(56) References Cited

U.S. PATENT DOCUMENTS

| | | | |
|---|---|---|---|
| 2003/0234741 A1 | 12/2003 | Rogers et al. | |
| 2005/0243936 A1 | 11/2005 | Agrawala et al. | |
| 2006/0056370 A1* | 3/2006 | Hancock | H04W 24/00 370/254 |
| 2006/0217132 A1* | 9/2006 | Drummond-Murray | H04W 64/00 455/456.2 |
| 2008/0242310 A1 | 10/2008 | Vassilovski | |
| 2010/0020776 A1* | 1/2010 | Youssef | H04W 64/00 370/338 |
| 2014/0266908 A1 | 9/2014 | Pandey | |
| 2015/0133172 A1 | 5/2015 | Silverman et al. | |
| 2015/0215892 A1 | 7/2015 | Teng | |
| 2015/0346313 A1 | 12/2015 | Smith et al. | |
| 2015/0365833 A1 | 12/2015 | Stafford et al. | |
| 2016/0066158 A1 | 3/2016 | Xiao et al. | |
| 2016/0345286 A1 | 11/2016 | Jamieson et al. | |
| 2019/0215074 A1* | 7/2019 | Vardarajan | H04B 10/2939 |

FOREIGN PATENT DOCUMENTS

| | | |
|---|---|---|
| CN | 104168650 A | 11/2014 |
| EP | 2362702 A1 | 8/2011 |

\* cited by examiner

```
<communication 1> <signal 1> <azimuth angle> <elevation angle> <date> <time> <device id> <duration>
                  <other data>
                  <signal 2> <azimuth angle> <elevation angle> <date> <time> <device id> <duration>
                  <other data>
                      ...
                  <signal n> <azimuth angle> <elevation angle> <date> <time> <device id> <duration>
                  <other data>
...
<communication n> <signal 1> <azimuth angle> <elevation angle> <date> <time> <device id> <duration>
                  <other data>
                  <signal 2> <azimuth angle> <elevation angle> <date> <time> <device id> <duration>
                  <other data>
                      ...
                  <signal n> <azimuth angle> <elevation angle> <date> <time> <device id> <duration>
                  <other data>
```

FIG. 10

EVALUATION OF ACCESS POINT PLACEMENT

BACKGROUND

The placement of a wireless access point relative to wireless devices may impact the ability of that access point to communicate with the wireless devices. Thus, changing the placement of the access point relative to the wireless devices that it communicates with may, in some circumstances, improve the overall performance of a wireless network served by the access point.

SUMMARY

The following summary presents a simplified summary of certain features. The summary is not an extensive overview and is not intended to identify key or critical elements.

Methods, systems and apparatuses are described for remote evaluation of a placement of an access point relative to one or more wireless devices. A potentially optimal placement for an access point may be close to or within a region roughly centered in a three dimensional space in which the wireless devices operate. The directions, relative to the access point and in three dimensions, of the communications received by the access point from the wireless devices may be determined. A predicted benefit for the overall performance from moving the access point to a potentially more optimal placement may be evaluated based on the distribution of the relative directions of the communications. A recommendation for moving the access point may be determined based on the predicted benefit. In some cases, moving the access point closer to a potentially more optimal placement may fail to satisfactorily improve or resolve performance issues. In such cases, the overall wireless performance may be improved by one or more range extending computing devices, such as signal range extenders, wireless repeaters, boosters, extenders, amplifiers, or secondary access points. The installation of the one or more range extending computing devices may be remotely evaluated for a premises. Data related to the wireless conditions for the premises may be collected periodically. Based on the collected data, a potential benefit for wireless performance from installing one or more range extending computing devices may be determined, and a recommendation may be provided for installing one or more range extending computing devices within the premises.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 10 shows example data that may be collected and/or sent for received communications.

DETAILED DESCRIPTION

Figure 1:
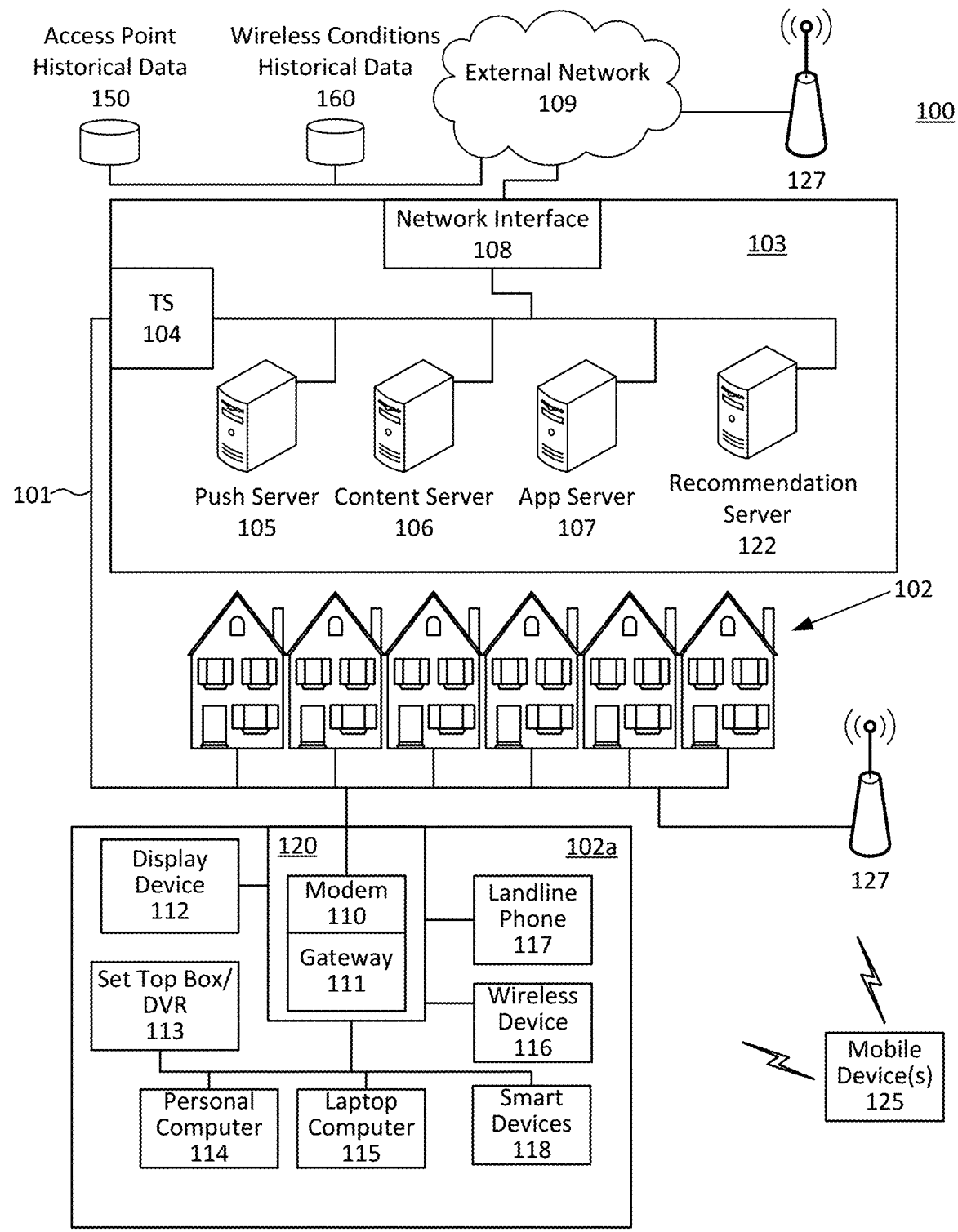
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

A wireless network may comprise one or more wireless devices in communication with a wireless access point. The access point may, for example, comprise a wireless router or gateway. The ability of the access point to communicate with the wireless devices may be affected by its distance to the wireless devices. Therefore, the placement of an access point within a premises may affect overall network performance throughout the premises. In many cases, an optimal placement for an access point may be within a core region that surrounds a center of a three-dimensional (3D) space occupied by the wireless devices with which the access point communicates. Poor signal strength, wireless coverage problems, and/or other network performance issues may often be improved by moving an access point to a core region associated with wireless devices in a wireless network served by that access point.

Location aware access point deployment within a premises may be challenging. An evaluation of access point placement is often based on determining the distances between the access point and the wireless devices that it communicates with. This evaluation may be performed by an inspection or on-site survey of the premises. However, it may not always possible to know the exact locations of the devices within the premises. Some devices may be hidden from view or inaccessible during the time of the evaluation. Mobile devices that communicate with the access point may not be present within the premises at the time of the evaluation. Determining distances between an access point and wireless devices based on signal strength measurements may be unreliable. Signal strengths provided by wireless transmitters may vary across devices, and signal strength may be affected by environmental factors other than distance (e.g., walls, windows, building materials, furniture, etc.). Performing an on-site survey may require a technician to make a service call to the premises which may be expensive and inconvenient for a customer. Evaluating access point placements for large numbers of customers based on on-site surveys may be impractical. Further, wireless performance issues related to access point placement may impact systems related to critical care in a hospital or home, or home security. Efficient management of such systems may be improved by timely and accurate identification and resolution of network performance issues related to access point placement.

To minimize and/or avoid on-site surveys, access point placement may be evaluated remotely based on communications received by an access point from one or more wireless devices. The access point may determine relative directions of received communications based, for example, on determining angle of arrival (AoA), and/or other direction of arrival, of signals associated with the received communications. Data indicating relative directions of the received communications may be collected over a period of time. A distribution of those relative directions may be compared to data collected for other arrangements of access points operating in core regions, and a score generated to indicate the potential benefit of moving the access point. The score may be adjusted based on other factors such as a number of devices, a number of mobile devices, and/or a number of stationary devices.

Evaluation of an access point placement may be performed by the access point and/or remotely. Remote evaluation of access point placement may be requested via an application executing on a computing device at a customer call center, via an application executing on computing device at a premises served by the access point, and/or by another computing device. The remote evaluation of access point placement may leverage edge computing and analytics. The evaluation may be performed by the access point or another edge device within the premises thus, reducing the amount of data sent over the network. The remote evaluation of access point placement may leverage machine learning and big data analytics. A machine learning algorithm may be trained on the data collected from multiple other premises to recommend access point placement for a particular premises, particularly where the homes have a similar form factor. In some examples, data collected across various similar form factor premises may be analyzed to discover previous patterns and Wi-Fi extender placements that may also be useful for providing recommendations on access point placement. Remote evaluation of access point placement may facilitate monitoring, prediction, and/or control of wireless performance issues. Remote evaluation of access point placement may be initiated based on detecting a change in access point placement. Results of the remote evaluation may be provided to a customer in real time and/or may be used by the customer to iteratively adjust the access point placement. Based on remote evaluation, a customer may be notified in advance about wireless performance issues that may be related to access point placement. The remote evaluation of access point placement may also be utilized for optimizing the placement of devices that communicate with an access point. The remote evaluation of access point placement may provide fast and accurate resolution of performance issues for networks related to critical care systems or Internet of Things (IoT) based home security.

FIG. 1 shows an example communication network 100. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as a recommendation server 122 (described below), additional push, content, and/or application servers, and/or other types of servers. Although shown separately, the push server 105, the content server 106, the application server 107, the recommendation server 122, and/or other server(s) may be combined. The recommendation server 122 may interface with one or more databases, such as an access point historical database 150 and a wireless conditions historical database 160, via the external network 109. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones) smart devices 118 (e.g. smart watches, smart attire, smart appliances, smart thermostats, light fixtures, light bulbs, motion sensors, temperature/atmospheric monitors, window security sensors, humidity sensors, temperature sensors, personal activity sensors, and other computing devices etc.), Zigbee devices, and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, Zigbee networks, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
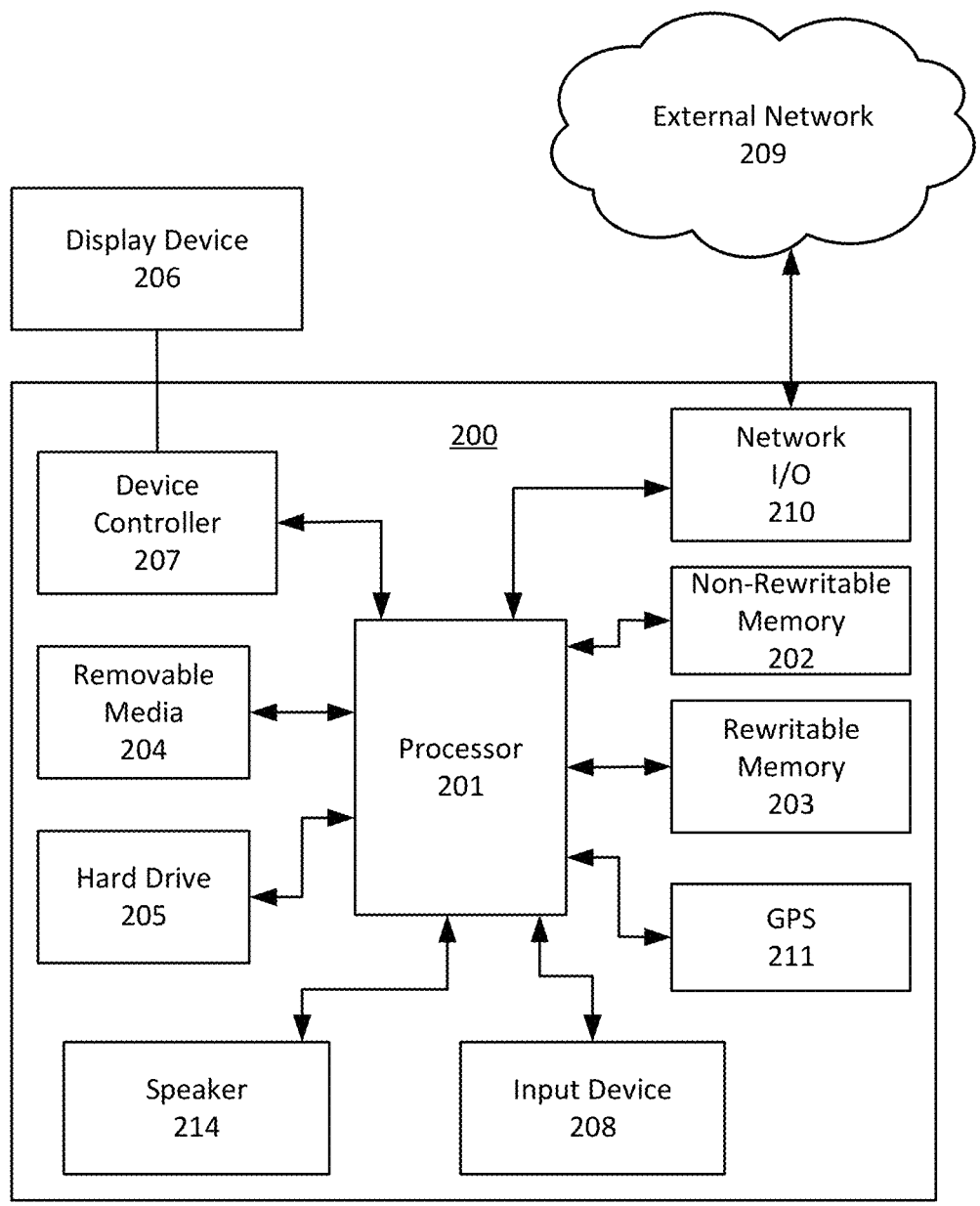
FIG. 2 shows hardware elements of a computing device in the example communication network of FIG. 1.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the recommendation server 122 in FIG. 1). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

The network I/O 210 may comprise, or be connected to, multiple antennas. The relative directions of communications received by the antennas of the network I/O 210 may be determined based on an analysis of the signals received by the antennas of the network I/O 210, and/or as described below.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
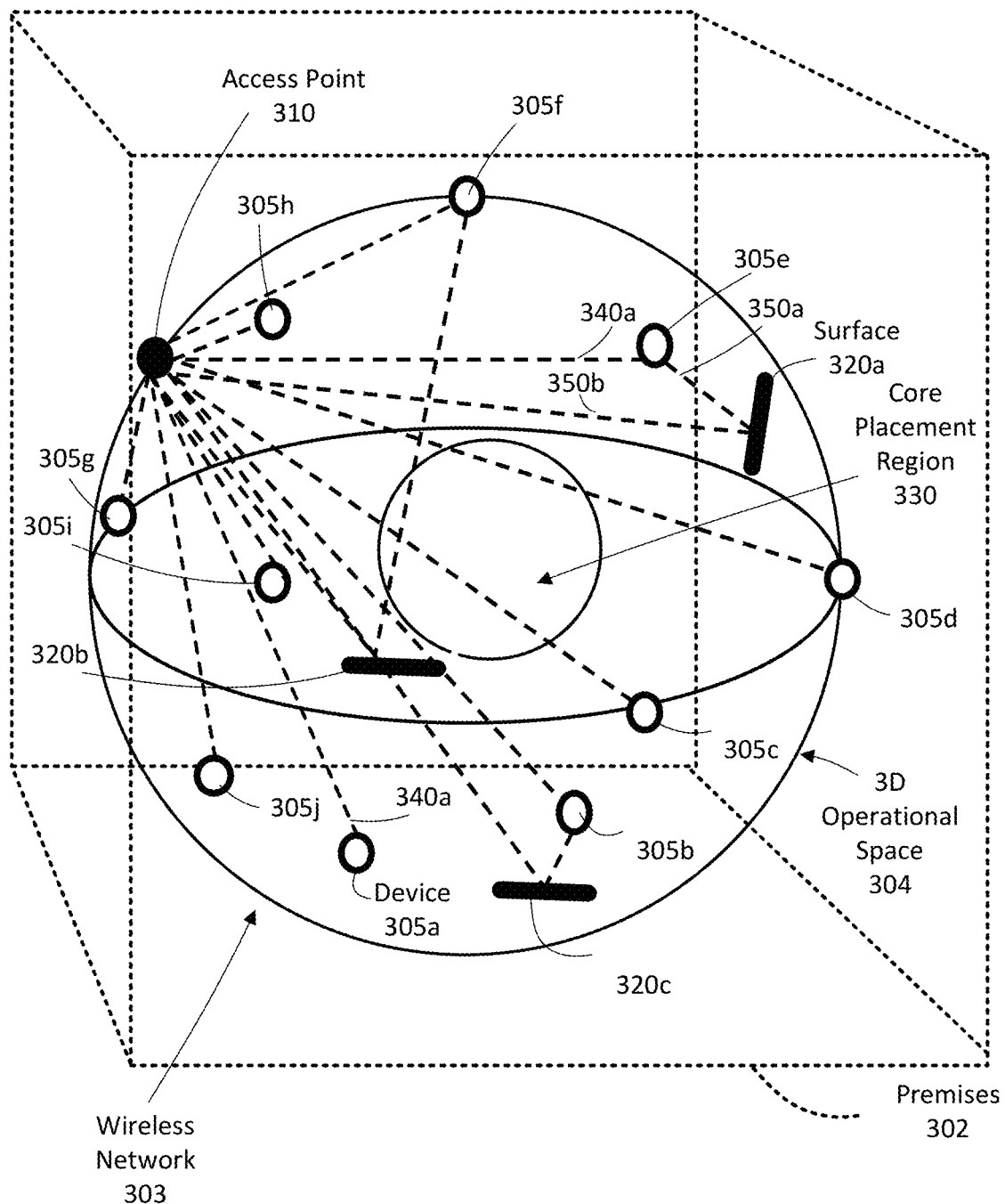
FIG. 3A shows a first placement of an access point within a simplified 3D operational space associated with a wireless network served by the access point.

FIG. 3A is a diagram showing an example of a simplified 3D operational space 304 of a premises 302 associated with a wireless network 303 served by an access point 310. The access point 310 may, for example, comprise a gateway (e.g., the gateway 111 shown in the premises 102a in FIG. 1). The example wireless network 303 comprises ten wireless devices 305a-305j (collectively or generically referred to as devices 305) located in the 3D operational space 304. The devices 305 may operate within the 3D operational space 304 by communicating with the access point 310. Some or all of the devices 305 may be movable within the 3D operational space 304. The 3D operational space 304 may represent some or all of an interior of a premises, and/or may comprise regions external to a premises (e.g., a patio near an outdoor pool), and/or may exclude part of a premises (e.g., a garage interior and/or other regions of a premises in which wireless network coverage is not needed). The 3D operational space 304 may comprise multiple levels (e.g., multiple floors) and/or may partitioned and/or otherwise divided (e.g., into rooms, hallways, etc.). For convenience, such details are omitted from FIG. 3A and other drawing figures. The premises 302 may comprise the premises 102a shown in FIG. 1. The devices 305 may comprise any of the devices 112-118 shown in the premises 102a in FIG. 1.

Communications from the devices 305 to the access point 310 are shown as broken lines between each of the devices 305 and the access point 310. There may be multiple communications from each of the devices 305 over a period of time. The locations of the devices 305 and/or of the core region 330 may be unknown to the access point 310. The access point 310 may, however, deduce and/or estimate (and/or facilitate deducing and/or estimating) this and/or other information based on information that the access point is able to determine from communications received from the devices 305. Such determined information may comprise, for example, signal strength, other signal quality measurements (e.g., channel state information (CSI), received signal strength indication (RSSI), packet error rates, packet dropped rates, signal-to-noise measures, etc.), and the directions of received signals relative to the access point 310.

The signals associated with the communications from the devices 305 may arrive at the access point 310 from different locations within the 3D operational space 304 due to multi-path propagation. Some of those signals may arrive at the access point 310 along direct propagation paths between the access point 310 and the devices 305. For example, a signal from the first device 305a may arrive at the access point 310 along a direct propagation path 340a. Some of the signals from the devices 305 may be reflected by various surfaces within the 3D operational space 304, such as the surfaces 320a-320d (generally referred to as surfaces 320) and may arrive at the access point 310 along indirect propagation paths (e.g., the paths 350a and 350b). The surfaces 320 may be objects within the premises 302, such as furniture, walls, etc.

The relative directions of the communications received by the access point 310 may be determined by the access point 310 or another device. The relative directions may be determined based on measuring an angle of arrival of signals associated with the received communications. For example, the access point 310 may determine the relative directions of the communications received by the access point 310 by measuring the angle of arrival of signals associated with the received communications. The AoA of a signal received by the access point 310 may be represented as a pair of angular measurements comprising an azimuth angle and an elevation angle.

Figure 4:
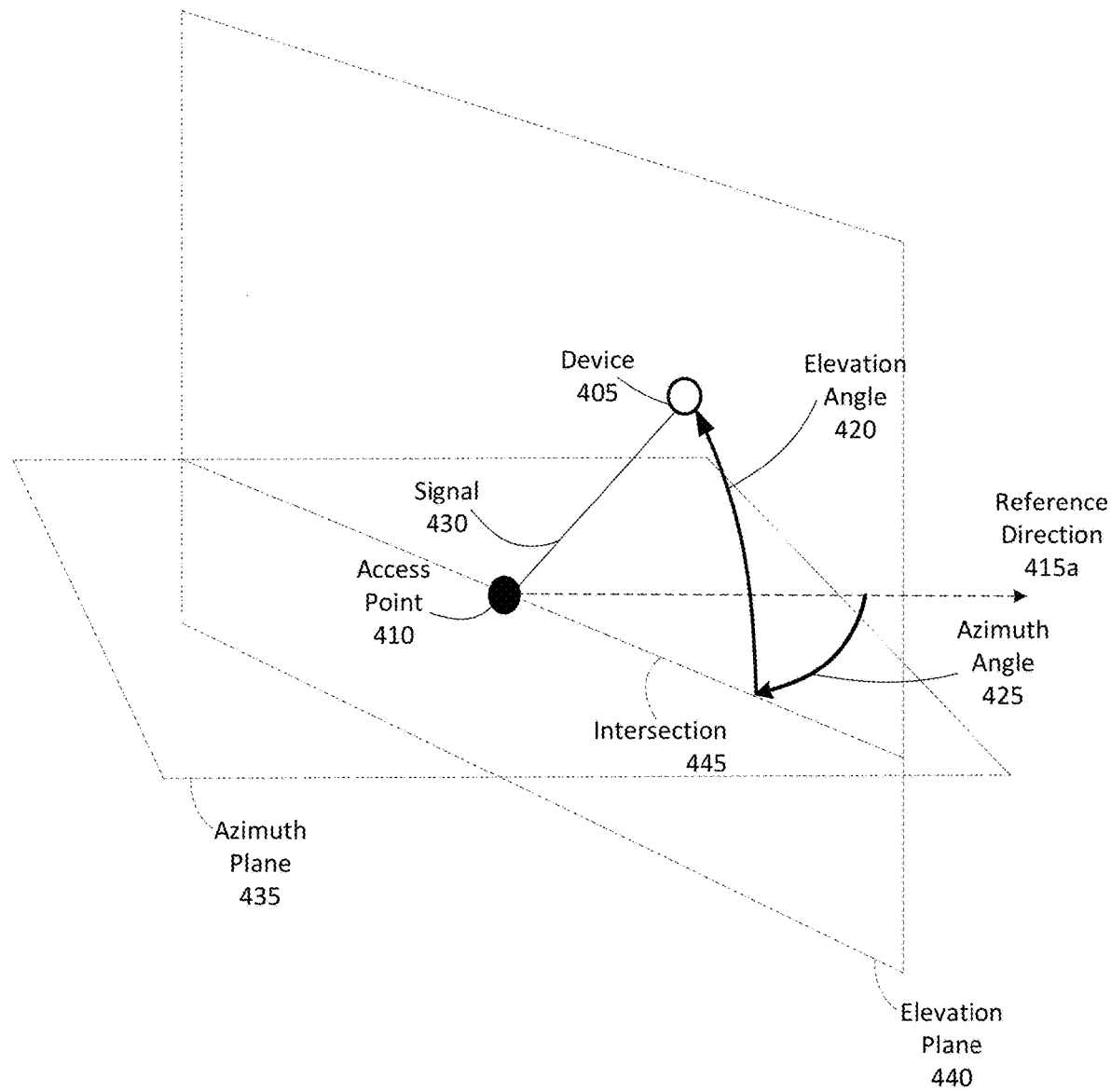
FIG. 4 shows an example angle of arrival for a signal.

FIG. 4 is a diagram showing azimuth and elevation angles for an example signal 430 received from a device 405 by an access point 410. An azimuth plane 435 passing through the access point 410 may be defined. Although the azimuth plane 535 may be horizontal, it need not be, and the azimuth plane may have any orientation relative to the external environment (e.g., relative to floors or other horizontal surfaces of a premises, such as the premises 302 in FIG. 3A). A reference direction 415a extending from the access point 410 in the azimuth plane may also be defined. An elevation plane 440 may be orthogonal to the azimuth plane 435 and may contain the path of the signal 430. Although the azimuth plane 435 may be the same for each AoA, each signal may lie in a different elevation plane. The azimuth angle 425 for the path of the signal 430 may be defined as an angle between the reference direction 415a and a portion of an intersection 445 (of the azimuth plane 435 and the elevation plane 440) that is on the same side of the access point 310 as the path of the signal 430. The elevation angle 420 may be defined as an angle between that same portion of the intersection 445 and the path of the signal 430. Azimuth angles and elevation angles may have values from 0° to 360°, although other units (e.g., radians) and/or conventions (e.g., values from −180° to 180°) may be used. Relative direction may also or alternatively be quantified using coordinate schemes other than azimuth/elevation angle pairs.

To simplify explanation, the relative directions signals received via reflected paths may be ignored in subsequent description. An access point may be configured to discriminate a signal received via a direct path from a version of that same signal received via a reflected path. Such discrimination may be performed, for example, based on arrival time difference or a phase difference between two such signals. However, relative directions of signals arriving via reflected paths may also or alternatively be determined and/or considered in connection with methods described herein.

Figure 5A:
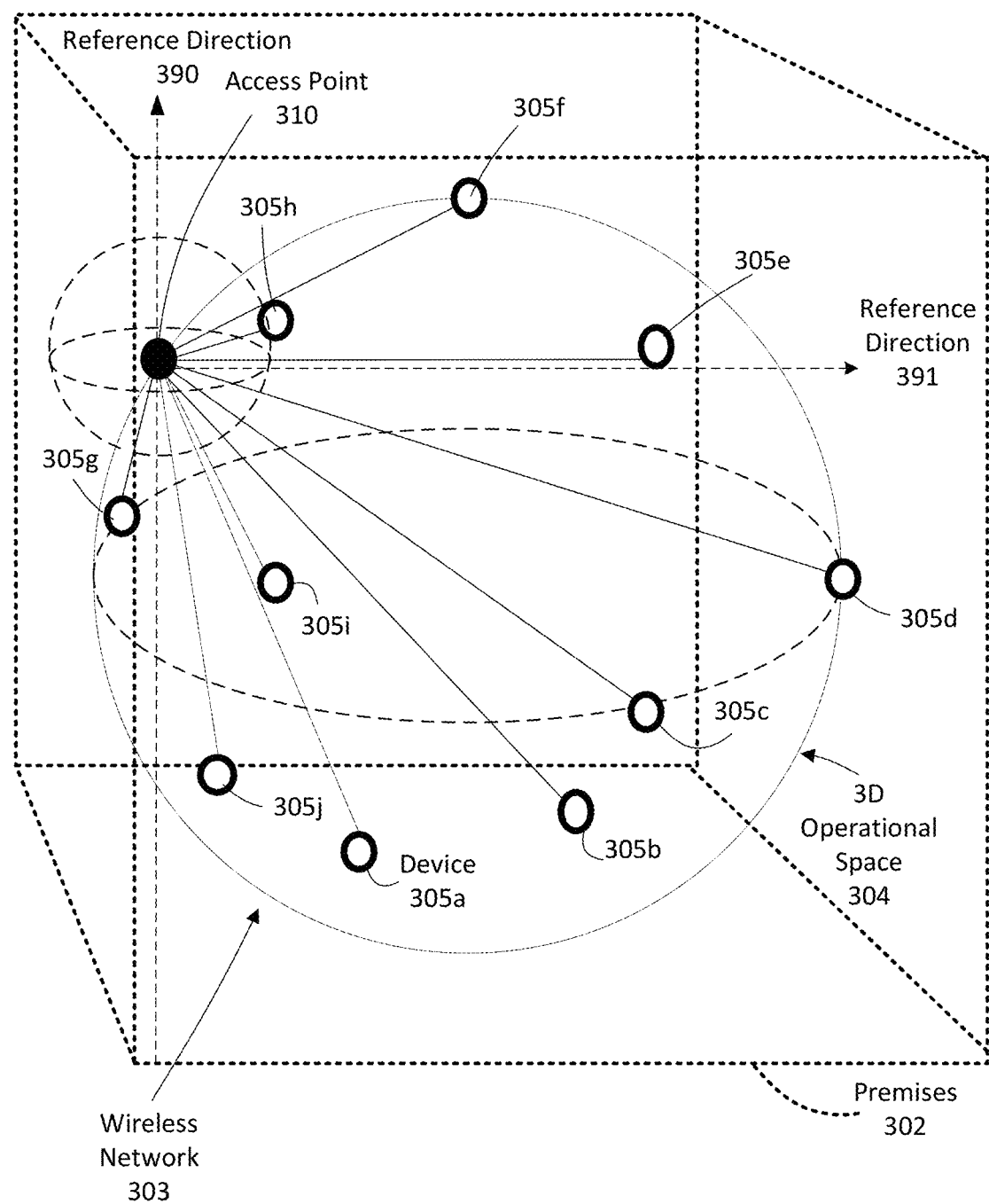
FIG. 5A shows example signals received along direct propagation paths by the access point in FIG. 3A.

FIG. 5A shows the signals in FIG. 3A that arrive at the access point 310 via direct propagation paths. Table 1 below shows example values for the azimuth and elevation angles for the signals shown in FIG. 5A.

TABLE 1

| Device | Azimuth Angle (°) | Elevation Angle (°) |
|---|---|---|
| 305a | 75 | 300 |
| 305b | 65 | 325 |
| 305c | 45 | 330 |
| 305d | 35 | 345 |
| 305e | 0 | 10 |
| 305f | 330 | 135 |
| 305g | 125 | 250 |
| 305h | 20 | 290 |
| 305i | 70 | 245 |
| 305j | 85 | 250 |

The access point 310 may be configured to collect and store data for communications received from the devices 305 over a period of time and to send the collected and stored data to another computing device, for example, the recommendation server 122. FIG. 10 shows example data that may be collected and/or sent for received communications. The data may comprise indicators for each communication, shown in FIG. 10 as "<communication 1>" through "<communication n>." The data may comprise, for each of the communications, indicators of the signals associated with that communication. These indicators are shown in FIG. 10 as "<signal 1>" through "<signal n>." The data may comprise, for each of the signals, indicators of an azimuth angle ("<azimuth angle>"), an elevation angle ("<elevation angle>"), an indicator of a date ("<date>"), a time ("<time>"), a device identifier ("<device id>"), a duration of the signal ("<duration>"), and other data, such as signal strength ("<other data>"). If a placement of the access point 310 changes, data for the received communications associated with a previous placement may be discarded. Also or alternatively, collected data for received communications may be stored by the access point 310 and/or by another computing device for a predetermined time period before being discarded. The collected data may be aggregated or summarized in access point 310 or other computing device for the purpose of reducing the total amount of data sent.

FIG. 3A shows the access point 310 displaced from the core region 330. A severity of deviation of an access point placement from a core region may be indicated by a distribution of relative directions described by the azimuth and elevation angle values of signals received by that access point. A relatively tight concentration of relative directions (e.g., contained in a narrow conical volume converging on the access point) may indicate displacement from a core region. A more diverse distribution of relative directions (e.g., extending omnidirectionally from the access point) may indicate that the access point is within a core region. A pattern of azimuth/elevation angle pairs in data received from a particular access point may be compared to patterns of azimuth/elevation angle pairs for placements of other access points known to be located in core regions. Based on that comparison, a score may be generated to indicate a likelihood of displacement of the particular access point from a core region associated with the devices in the wireless network served by the particular access point.

Figure 7A:
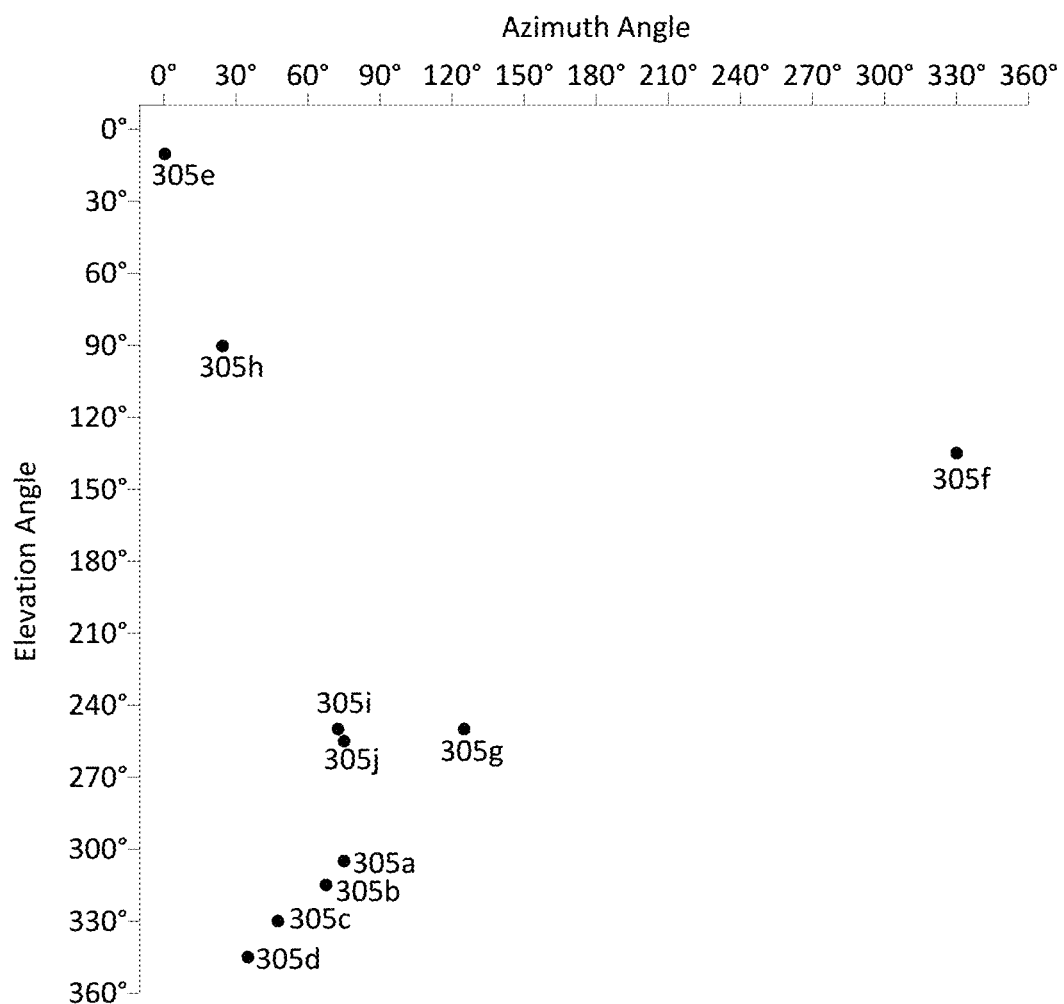
FIG. 7A shows an example distribution of AoA measurements for the signals shown in FIG. 5A.
Figure 8A:
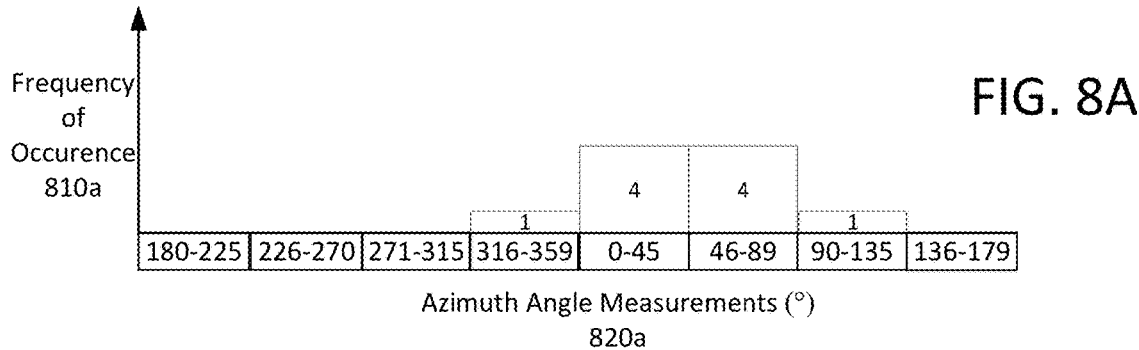
FIGS. 8A-B show example histograms of the AoA measurements shown in FIG. 7A.
Figure 8B:
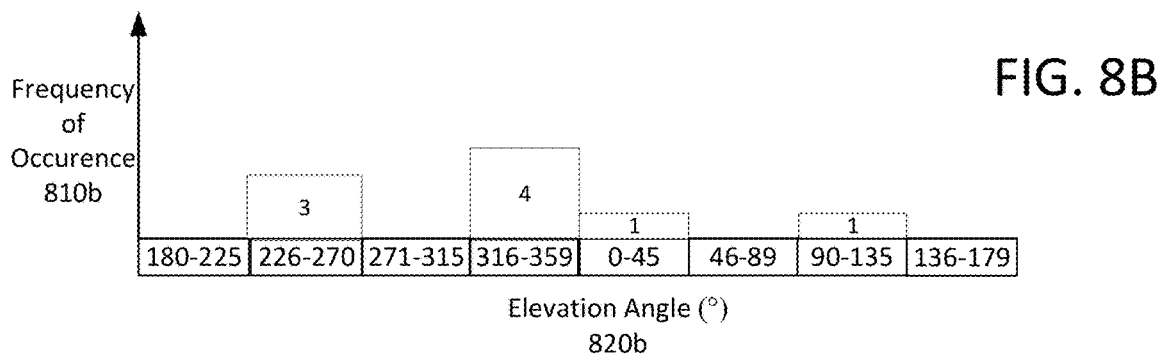

A distribution of the azimuth and elevation angle measurements may be evaluated. FIG. 7A shows an example distribution of the AoA measurements (shown in Table 1) for the signals shown in FIG. 5A. For purposes of explanation, the distribution is represented in FIG. 7A as plot diagram. However, the distribution may be represented in other ways, for example, in a histogram format. The distribution of AoA is shown across a range of 360 azimuth angles and a range of 360 elevation angles resulting in 129,000 (360×360) possible combinations of azimuth and elevation angle values. The plot diagram in FIG. 7A indicates a clustering of AoA measurements for signals associated with the devices 305a-d, 305g, 305i, and 305j. FIGS. 8A-B show a histogram representation of the distribution of the AoA of the signals in FIG. 5A and Table 1.

Figure 6A:
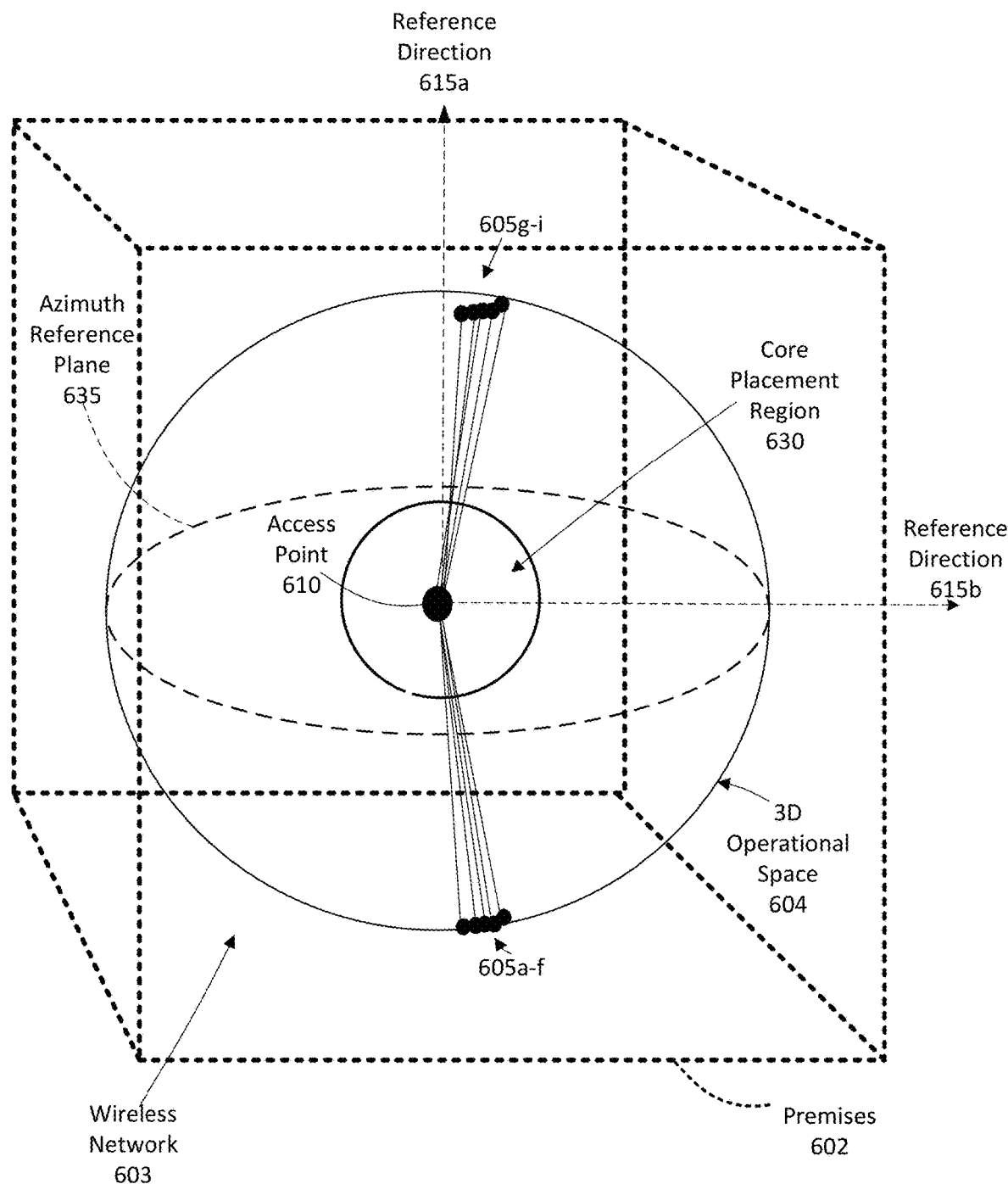
FIG. 6A shows an example configuration of an access point and associated devices.
Figure 7B:
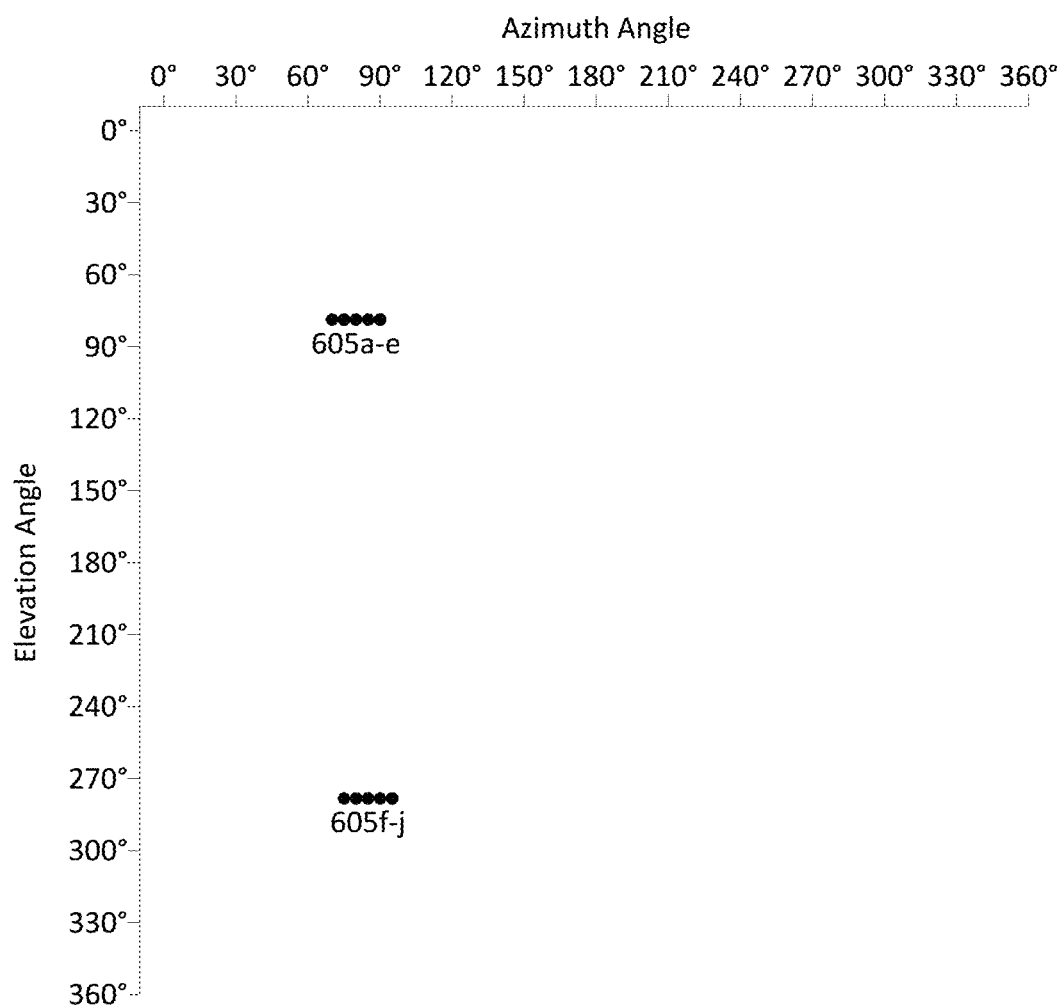
FIG. 7B shows an example distribution of AoA measurements for the signals shown in FIG. 6A.

While a single close grouping or clustering may indicate non-optimal access point placement, several close groupings that are sufficiently spaced apart may indicate optimal access point placement. FIG. 6A is an example configuration showing a placement of an access point 610 within a core placement region 630. The devices 605f-j may be placed in close proximity to each other at a distance above the core placement region 330 while the remaining devices 605a-e may be placed in close proximity to each other at a distance below the core placement region 630. Table 2A below provides example azimuth and elevation angle measurements for the signals shown in FIG. 6A. FIG. 7B shows an example plot diagram of the distribution of azimuth and elevation angles shown in Table 2A. In this example configuration, the distribution of angle measurements of signals shown in Table 2A and FIG. 7B indicate a clustering or grouping of azimuth angle measurements around 80 degrees. Additionally, the distribution of angle measurements of signals shown in Table 2A and FIG. 7B indicate a clustering or grouping of elevation angle measurements around 80 degrees and 280 degrees. However, as shown in FIG. 6A, the placement of the access point 610 is close to a potentially optimal placement relative to the devices 605.

TABLE 2A

| Device | Azimuth Angle (°) | Elevation Angle (°) |
|---|---|---|
| 605a | 80 | 80 |
| 605b | 81 | 80 |
| 605c | 82 | 80 |
| 605d | 83 | 80 |
| 605e | 84 | 80 |
| 605f | 80 | 280 |
| 605g | 81 | 280 |
| 605h | 82 | 280 |
| 605i | 83 | 280 |
| 605j | 84 | 280 |

Figure 6B:
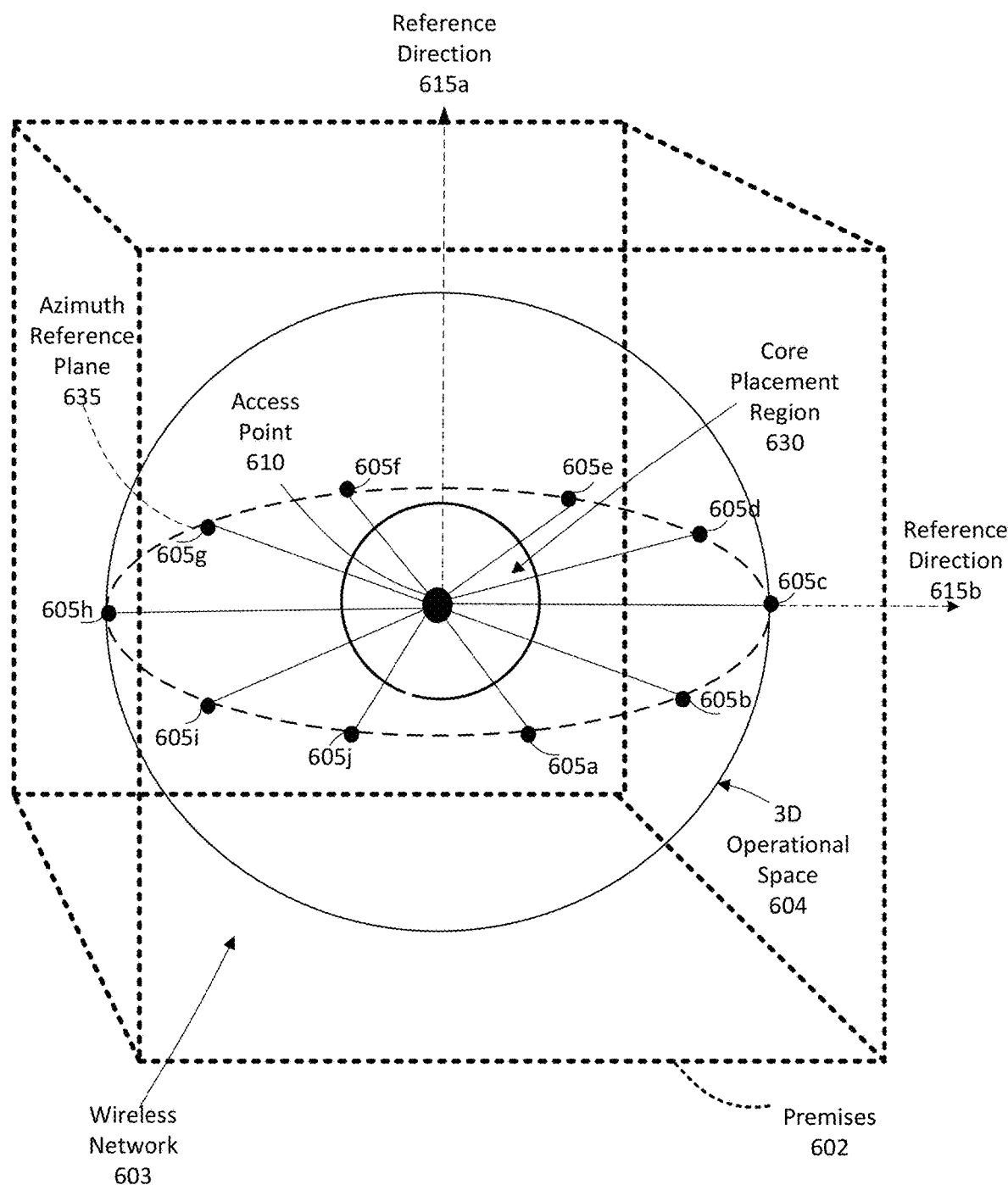
FIG. 6B shows another example configuration of an access point and associated devices.
Figure 7C:
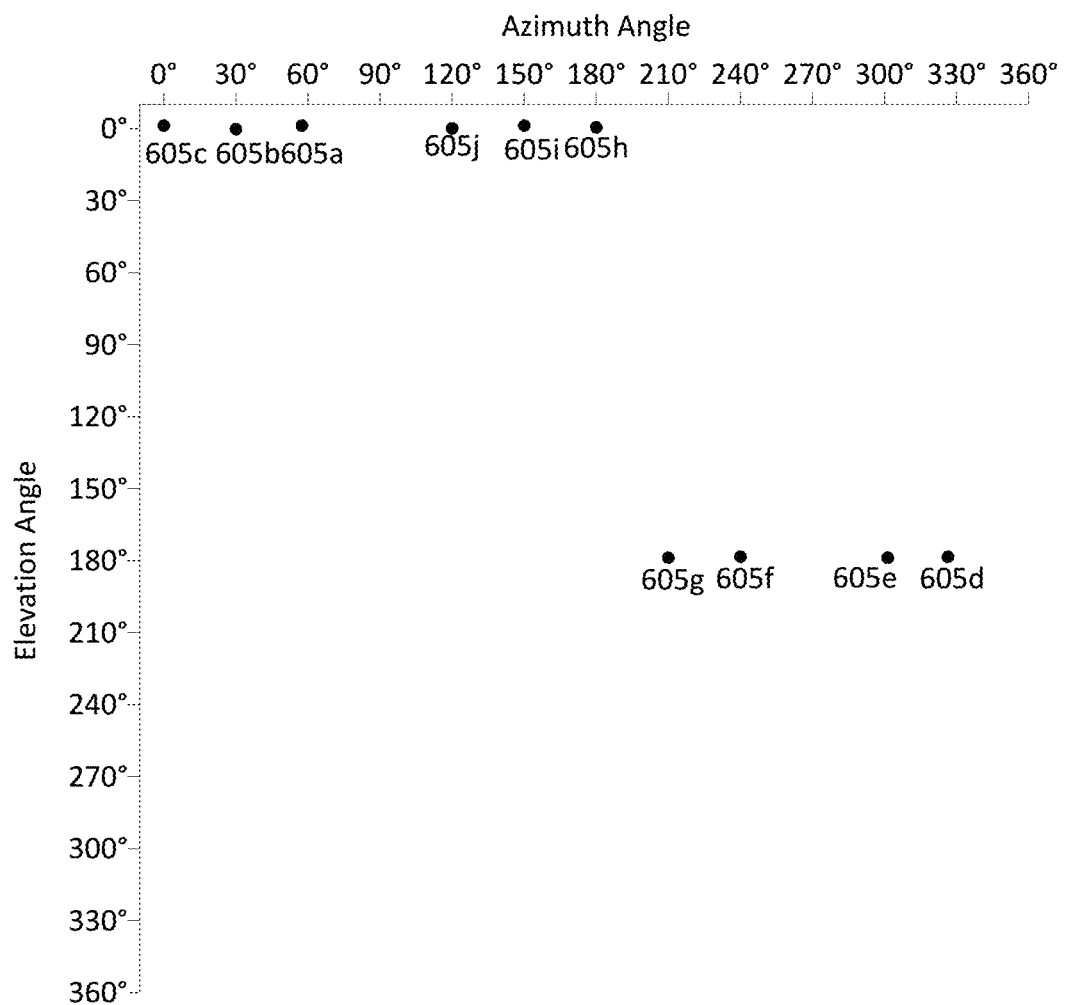
FIG. 7C shows an example distribution of AoA measurements for the signals shown in FIG. 6B.

FIG. 6B is another example configuration showing the placement of the access point 610 from FIG. 6A within the core placement region 630. In the configuration shown in FIG. 6B, the devices 605f-j may be evenly spaced around the azimuth reference plane 635. Table 2B below provides example azimuth and elevation angle measurements for the signals shown in FIG. 6B. FIG. 7C shows an example plot diagram of the distribution of azimuth and elevation angles shown in Table 2B. In this example configuration, the distribution of azimuth and elevation angle measurements of signals shown in Table 2B and FIG. 7C indicate a clustering or grouping of elevation angle measurements around 0 degrees and 180 degrees. However, as shown in FIG. 6B, the placement of the access point 610 is close to a potentially optimal placement relative to the devices 605.

TABLE 2B

| Device | Azimuth Angle (°) | Elevation Angle (°) |
|---|---|---|
| 605a | 60 | 0 |
| 605b | 30 | 0 |
| 605c | 0 | 0 |
| 605d | 330 | 180 |
| 605e | 300 | 180 |
| 605f | 240 | 180 |
| 605g | 210 | 180 |
| 605h | 180 | 0 |
| 605i | 150 | 0 |
| 605j | 120 | 0 |

To assess a significance of a specific distribution of relative directions, statistical variations (or measures of variations) in the distributions of the relative directions over a period of time may be evaluated. Various standard components of statistical variation, such as a range, variance, and standard deviation, of a distribution of relative directions may be evaluated. For example, the variance may be lower for a more diverse distribution of relative directions and higher for a less diverse distribution of relative directions.

Additionally, the evaluation may also leverage known patterns of statistical variations that historically have indicated that an access point placement is or is not close to a potentially optimal placement. The patterns of statistical variations may be determined by utilizing historical data about relative directions of received communications for different access points across premises. The recommendation server 122 may access the historical data by interfacing with one or more databases, such as the access point historical data 150, via the external network 109.

Figure 3B:
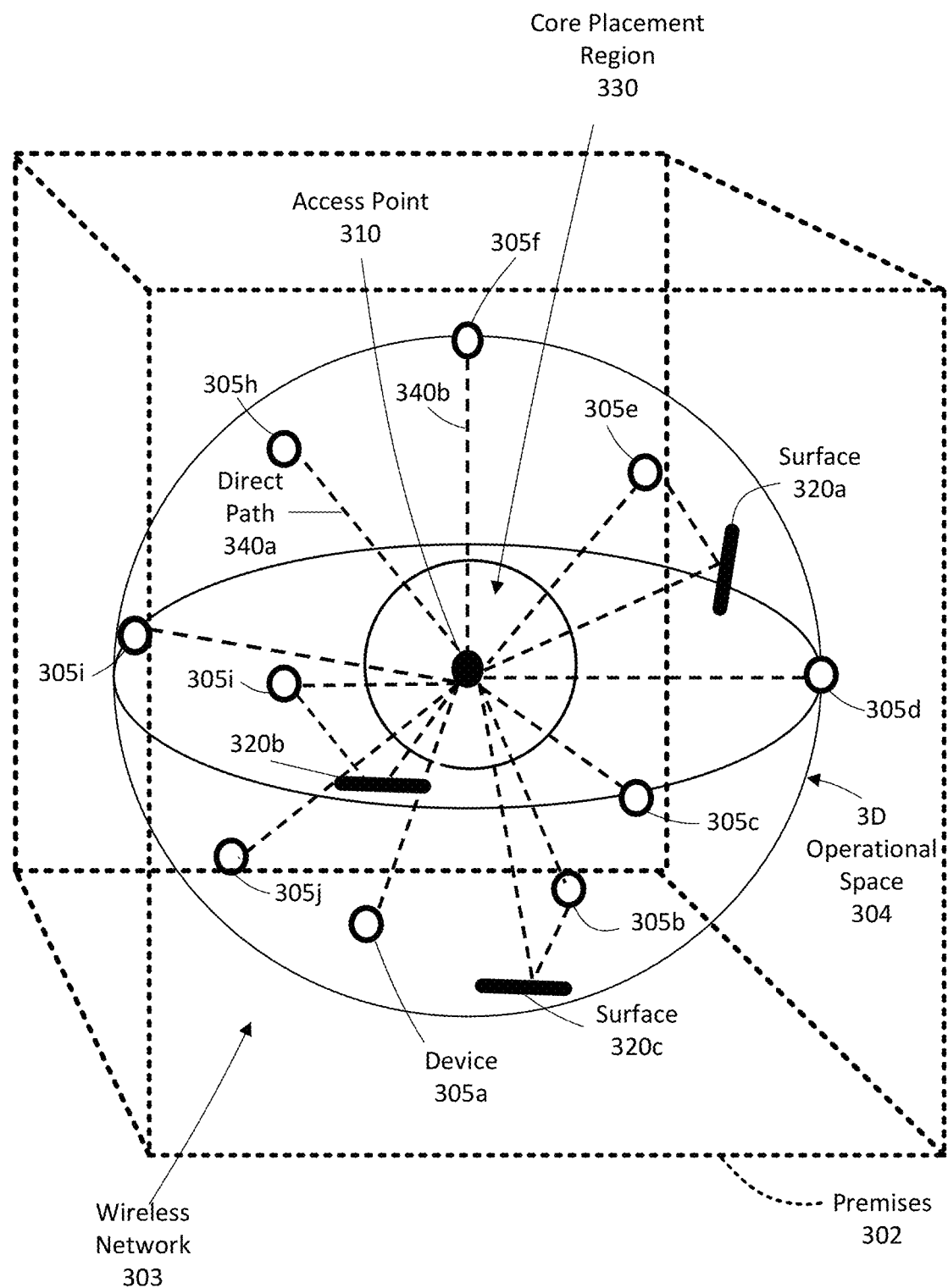
FIG. 3B shows a second placement of the access point within the simplified 3D operational space shown in FIG. 3A.
Figure 5B:
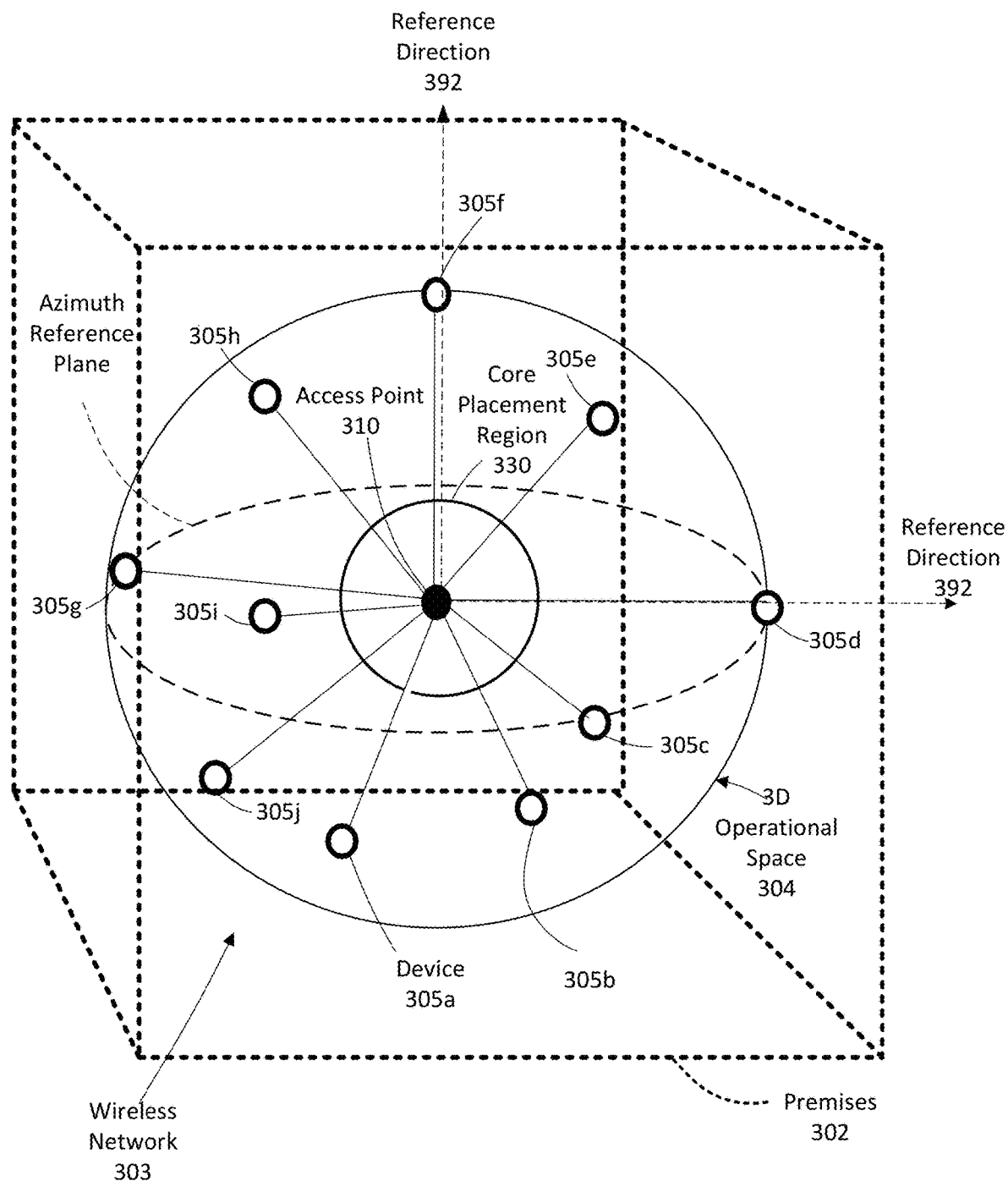
FIG. 5B shows example signals received along direct propagation paths by the access point in FIG. 3B.

For sufficiently large deviations of an access point placement from a potentially optimal placement, moving the access point closer to the potentially optimal placement may improve the overall wireless performance. Thus, moving the access point 310 closer to or within the core placement region 330 may improve the overall wireless performance of the wireless network 303. FIG. 3B shows a change in placement of the access point 310. In FIG. 3B, the access point 310 is placed within the core placement region 330. The placement of the access point 310 shown in FIG. 3B may be evaluated based on determining a distribution of the azimuth and elevation angle measurements of the signals associated with the communications received by the access point 310 in its new location shown in FIG. 3B. For purposes of explanation, the relative directions of only the signals received along direct propagation paths are discussed. However, the relative directions of the signals arriving along both direct and reflected propagation paths may be determined. FIG. 5B shows the signals in FIG. 3B that arrive at the access point 310 along direct propagation paths. Table 3A below provides example azimuth and elevation angle measurements for the signals shown in FIG. 5B.

TABLE 3A

| Device | Azimuth Angle (°) | Elevation Angle (°) |
|---|---|---|
| 305a | 110 | 315 |
| 305b | 80 | 330 |

TABLE 3A-continued

| Device | Azimuth Angle (°) | Elevation Angle (°) |
|---|---|---|
| 305c | 45 | 0 |
| 305d | 0 | 0 |
| 305e | 45 | 45 |
| 305f | 90 | 90 |
| 305g | 135 | 135 |
| 305h | 190 | 180 |
| 305i | 170 | 220 |
| 305j | 135 | 290 |

Figure 7D:
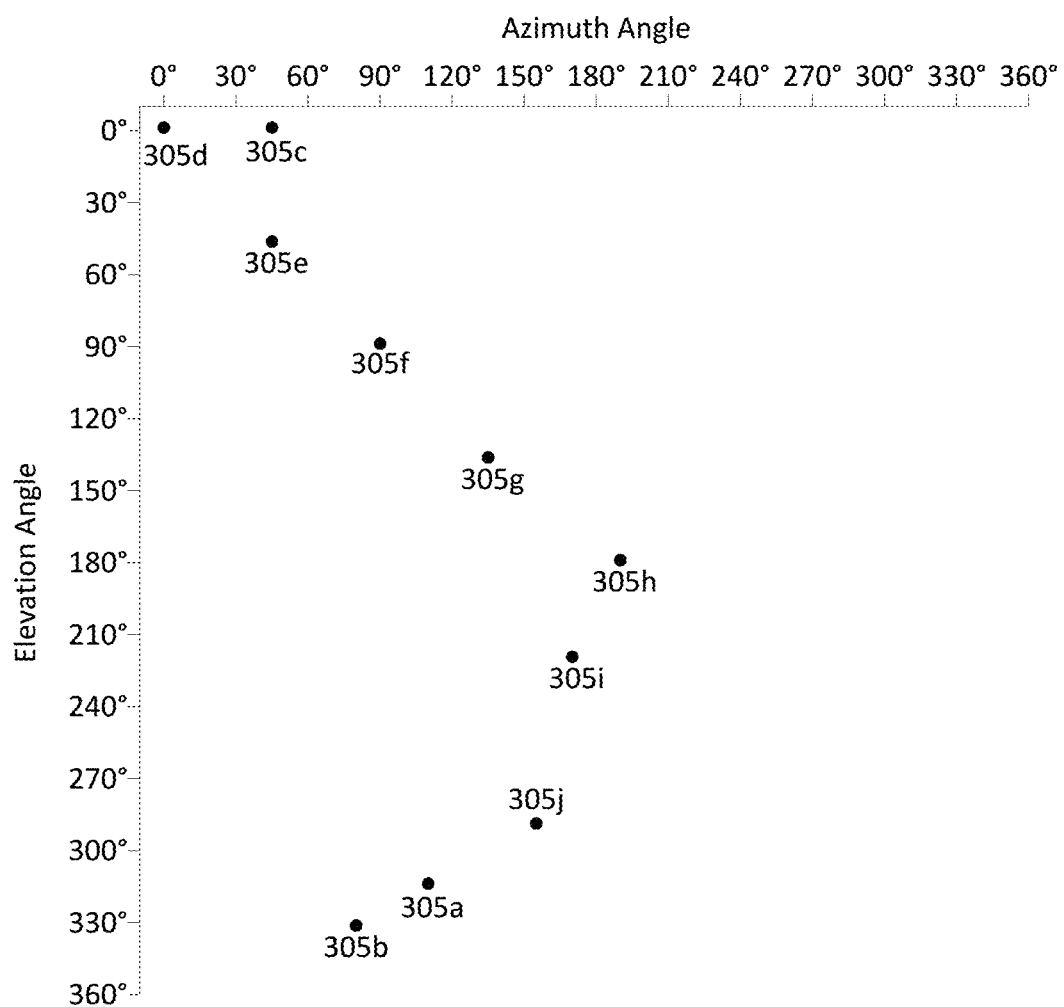
FIG. 7D shows an example distribution of AoA measurements for the signals shown in FIG. 5B.
Figure 8C:
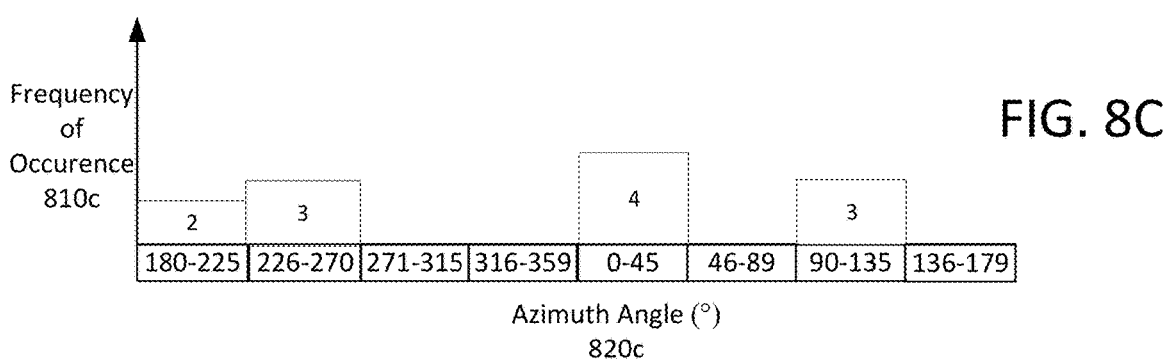
FIGS. 8C-D show example histograms of the AoA measurements shown in FIG. 7D.
Figure 8D:
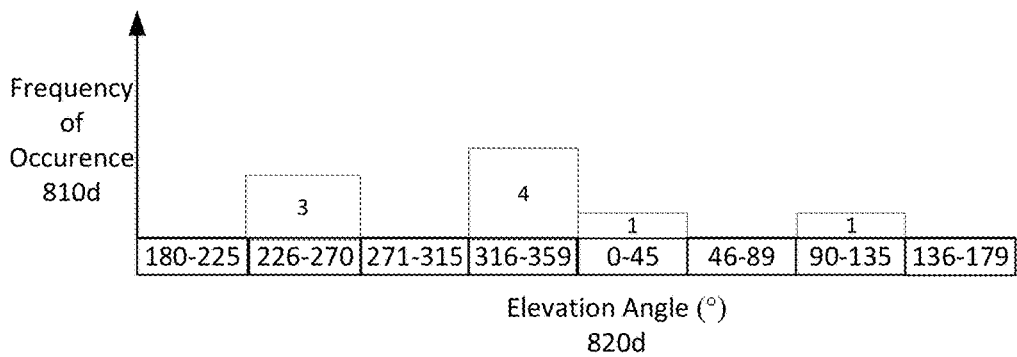

FIG. 7D shows a distribution of the AoA of the signals shown in FIG. 5B and Table 3A. For purposes of explanation, the distribution is represented in FIG. 7D as plot diagram. However, the distribution may be represented in other ways, for example, as a histogram shown in FIGS. 8C-D. The distribution of AoA is shown across a range of 360 azimuth angles and a range of 360 elevation angles resulting in 129,000 (360×360) possible combinations of azimuth and elevation angle values. The plot diagram in FIG. 7D of a more optimal access point placement shows a more even distribution of AoA measurements in comparison with the plot diagram in FIG. 7A of a non-optimal access point placement.

A predicted benefit to the overall wireless performance of moving the access point closer to a potentially optimal placement may be assessed based on a distribution of relative directions of received communications and other additional factors. The predicted benefit may be provided as a recommendation score. As discussed above, a clustering of relative directions may not always indicate a deviation of an access point placement from a potentially optimal placement. In some cases, a clustering of relative directions of the received communications may simply mean that the devices are located close to each other. Therefore, a recommendation score (predicted benefit of moving the access point) may be determined based on evaluating a statistical variation of the distribution of relative directions.

Additionally, the recommendation score may also be based on leveraging known patterns of statistical variations of distributions of relative directions that historically have indicated that the access point is or is not in an optimal location relative to the devices (near a core placement region). For example, the orientation of the access point 310 relative to a reference point may be unknown to the recommendation server 122. Even if the access point 310 is part of a group of access points that are known to measure the AoA of received signals according to a common scheme, the recommendation server 122 may be unable to determine an orientation for each individual access point once the access point is placed within the premises. For example, an access point may be mounted on a wall or otherwise positioned so that its corresponding azimuth plane may not be a horizontal plane, as shown in FIG. 4. Therefore, data from access points in various placement configurations across multiple premises may be analyzed to determine patterns, e.g., a specific collection of directions in one or more planes orthogonal to a first plane.

Additionally, certain patterns within a distribution of relative directions may be indicative of access point placement that may be optimal relative to the locations of associated devices. FIGS. 6A-B show a few example configurations of optimal access point placement. However, numerous other examples may be readily determined and catalogued based on data gathered across different premises. If, for example, there is a first plane (e.g. an azimuth plane for an access point sitting level) in which signal directions are spread over at least 180 degrees, and if none of those signal directions correspond to a direction of an orthogonal plane (e.g., in an elevation plane for an access point sitting level) that is outside of a range of 350 degrees to 10 degrees, or a range of 170 degrees to 190 degrees, that may indicate that the access point is in a location in which all wireless devices are on a single floor of the premises and spread around the access point in all directions. A distribution of relative directions for an access point, whether all devices connected to the access point are on a single floor, and the relative angular spread of the devices may be utilized to determine a recommendation score. The recommendation score may indicate a potential benefit to the overall performance of moving the access point.

The recommendation score may be provided as a relative score. The recommendation score may comprise a value between 0 and 100, although other ranges of scores may also or alternatively be used. The recommendation score may be determined such that higher recommendation scores may be indicative of a greater predicted benefit of moving the access point 310 than lower recommendation scores. Alternatively, the recommendation score may be determined such that lower recommendation scores may be indicative of a greater predicted benefit of moving the access point 310 placement than higher recommendation scores.

The access point 310, the recommendation server 122, and/or one or more other computing devices may be configured to determine a confidence factor. The confidence factor may indicate a reliability of the recommendation score. The recommendation score may be adjusted based on the confidence factor. The confidence factor may depend on factors, such as a total number of devices 305 communicating with the access point 310 and the device types of the devices 305. For example, a larger number of devices 305 associated with the access point 310 may increase the confidence factor. Because mobile devices tend to travel through a larger portion of a premises, a larger number of mobile devices 305 may increase the confidence factor while a larger number of static devices 305 that remain in the same location may decrease the confidence factor. As the mobile devices move throughout the premises, the signal may be analyzed dynamically to determine optimal placement. As discussed above, the access point 310 may be configured to collect and store data about the received communications. The access point 310 may send the collected data to the recommendation server 122. Based on the collected data, the recommendation server 122 may determine, for example by utilizing the device identifiers, that the relative directions of the received communications from a particular device 305 are consistent over a period of time. This may suggest that the device 305 is stationary. Other collected information may be utilized to determine a device type, such as the MAC address of the device may also suggest whether the device is stationary or mobile.

The recommendation score and/or the confidence factor may be determined based on excluding the data of one or more of the devices 305. The excluded devices 305 may be specified by a user by providing the MAC addresses of the excluded devices 305. As an example, data for a device belonging to a user that is temporarily residing in a home, such as a college student that was home over a break, may be excluded from the evaluation of the access point placement. As another example, in order to avoid unnecessarily constraining the access point placement, some mobile devices may be excluded from the evaluation since these devices are likely to move throughout the premises and thus their locations may change after the evaluation of the access point placement.

The recommendation score and/or confidence score may be determined based on selecting a priority for one or more devices 305. For example, a device with a location that is constrained to a specific region of the premises may be used infrequently, and thus may insignificantly impact the evaluation of the access point placement. However, in order to increase the likelihood that a new placement of the access point does not negatively impact the wireless performance for this device, a user may select this device to have a higher priority so that it may be considered in the evaluation of access point placement. As another example, a device may be infrequently present within the premises, and therefore based on the collected data of the received communications over a period of time, this device may insignificantly impact an evaluation of access point placement. However, in order to provide good wireless connectivity when the device is present in the premises, a higher priority may be assigned to this device. The evaluation of access point placement may be based on adding received communication from this device during the time that the device was not present. The additional received communications may be generated based on the existing collected and stored data for the received communications from this device.

The recommendation score and/or the confidence factor may be determined based on user behavior associated with one or more of the devices 305. The recommendation score and/or confidence factor may be determined based on the expected or actual locations of the devices 305. For example, data collected over a period of time may indicate that the relative directions of received communications for one of the devices 305 should be considered even though it may not be present within the premises at the time that the placement of the access point 310 is evaluated.

A recommendation for moving the access point may be determined based on the relative score and the confidence score. For example, the recommendation score may be adjusted by applying the confidence factor to the recommendation score as a weight. The indication of whether the access point 310 should be moved may be based on a comparison of the recommendation score and/or confidence factor to one or more thresholds. The minimum and maximum values for the thresholds may be set based on evaluating historical data collected over time across multiple premises. For example, the thresholds may vary based on a type of premises, such as a home or a business. If a recommendation to move an access point is based only on the recommendation score, a high recommendation score of 95 may result in a recommendation to move the access point. However, if a recommendation to move an access point is based on a combination of the recommendation score and the confidence score, a low confidence score would indicate a low reliability of the recommendation score. Thus, a recommendation score of 95, evaluated in combination with a low confidence score of 20, may result in a recommendation that the access point 310 should not be moved. A high recommendation score in combination with a high confidence factor may indicate a high reliability of the recommendation score and thus, may result in a recommendation that the access point 310 should be moved.

A low confidence score may indicate that it may not be possible to provide any recommendation for moving or not moving the access point. A low recommendation score in combination with a low confidence factor may indicate a low reliability of the recommendation score and thus, may not result in any recommendation for moving the access point. In this case, further evaluation of the access point placement may be needed. A low recommendation score in combination with a high confidence factor may indicate a high reliability of the recommendation score and thus, may result in a recommendation that the access point 310 should not be moved.

Additional information about the premises or devices may be utilized by the recommendation server 122 in order to suggest a new location for the access point 310 within the premises or a distance from the current location that the access point 310. The recommendation may be provided by the access point 310. The recommendation may be provided by a call-center agent to the customer or directly to the customer via a mobile application executing on a user device.

An example of determining recommendation scores for the access point placements shown in FIG. 3A and FIG. 3B will now be discussed. The recommendation score may be a relative score comprising a value between 0 and 100. A recommendation score of 100 may indicate that an access point placement is very close to an optimal placement, for example, within a core region 330 shown in FIGS. 3A and 3B.

The diversity or spread of the relative directions within a distribution may be evaluated using standard measures of statistical variation, such as a range, variance, and standard deviation. For example, calculation of a range for a distribution of data may indicate how spread out the data (or angle measurements) is, however, if there are outliers in the data, the range may not provide a true indication of the diversity or spread of the data. Outliers in the data may be associated a device that was present within the premises for a short duration within the time period during which the data was collected. A smaller range or standard deviation, may indicate lower variability in the collected data. For example, a lower standard deviation may indicate a lower variability from the mean of the distribution of relative directions. Further, a lower variance may indicate a more diverse distribution of relative directions while a higher variance may indicate a less diverse distribution of relative directions.

Table 3B shows statistical variations for the AoA measurements in Table 1 and Table 3A. Referring back to Table 1 and FIG. 5A, Table 3B indicates that the mean of the azimuth angle measurements is about 85 degrees, and the mean of the elevation angle measurements is about 215 degrees. The range of the azimuth angle measurements is about 330 and the range of the elevation angle measurements is about 335. The variance of the azimuth angle measurements is about 8655, and the variance of the elevation angle measurements is about 10662. The standard deviation of the azimuth angle measurements is about 93, and the standard deviation of the elevation angle measurements is about 103. Referring back to Table 3A and FIG. 5B, Table 3B indicates that the mean of the azimuth angle measurements is about 100 degrees, and the mean of the elevation angle measurements is about 160 degrees. The range of the azimuth angle measurements is about 190, and the range of the elevation angle measurements is about 330. The standard deviation of the azimuth angle measurements is about 58, and the standard deviation of the elevation angle measurements is about 126. The variance of the azimuth angle measurements is about 3566, and the variance of the elevation angle measurements is about 15974. The default value of the recommendation score may be adjusted and increased or decreased based on the statistical variation measurements for the distribution. As the statistical variations increase, the default value may be adjusted to account for increased variations.

TABLE 3B

| Measure of Statistical Variation | FIG. 5A Azimuth Angle Measurements (°) | FIG. 5B Azimuth Angle Measurements (°) | FIG. 5A Elevation Angle Measurements (°) | FIG. 5B Elevation Angle Measurements (°) |
|---|---|---|---|---|
| Range | 330 | 190 | 335 | 330 |
| Variance | 8655 | 3566 | 10622 | 15974 |
| Mean | 85 | 100 | 215 | 160 |
| Standard Deviation | 93 | 58 | 103 | 126 |

The evaluation of access point placement may also or alternatively leverage known patterns of statistical variations that historically have indicated that an access point placement is or is not close to a potentially optimal placement. As discussed above, a less diverse distribution, for example a clustering or close grouping of azimuth or elevation angle measurements may not indicate a deviation of the access point placement from a potentially optimal placement. Therefore, the statistical variations for the distribution of relative directions collected for the access point over a period of time, may be further analyzed relative known patterns of statistical variations observed for other distributions of relative directions previously collected for the same access point or for other access points within other premises. In some cases, although the statistical variation measurements may point to a more diverse distribution of relative directions, they may comprise a pattern observed in statistical variation measurements associated with non-optimal access point placements. The patterns of statistical variations may be determined based on historical data for relative directions of received communications collected for different access points across different premises. The recommendation server 122 may access the historical data by interfacing with one or more databases, such as the access point historical data 150, via the external network 109.

Moving an access point may sometimes fail to satisfactorily improve wireless coverage and connectivity issues for a premises. For example, if a coverage area associated with an access point is sufficiently large and wireless devices are located close to the edge of the coverage area, performance may suffer even if the access point is placed in a core region. In such situations, the wireless devices may disconnect from the wireless network or experience other performance issues. An additional evaluation may be performed to assess whether the wireless network performance may be improved by installing one or more range extending computing devices.

Figure 9A:
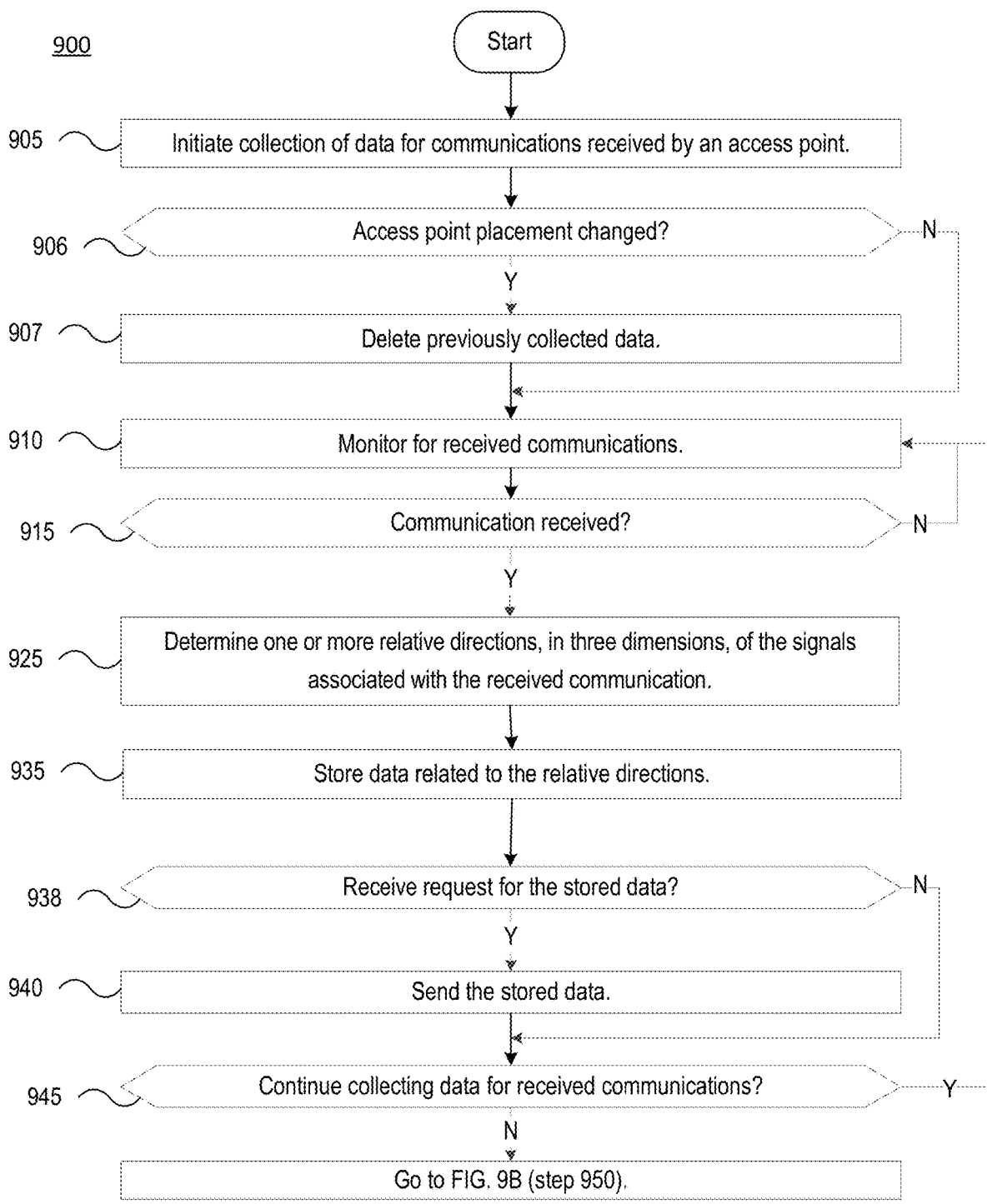
FIG. 9A shows a flow diagram of an example method for remote evaluation of access point placement.

FIG. 9A is a flow diagram showing steps of an example method 900 for evaluating a placement of an access point, such as the access point 310 in FIG. 3A (and/or one or more of the other access points shown in other drawing figures and/or described herein), and/or installation of one or more repeaters. The steps of the method 900 may be performed by the recommendation server 122 shown in FIG. 1 and/or the access point 310 shown in FIG. 3A (and/or one or more of the other access points shown in other drawing figures and/or described herein). Alternatively or additionally, some or all of the steps of the method 900 may be performed by one or more other computing devices. Steps of the method 900 may be modified, omitted, and/or performed in other orders, and/or other steps added.

At step 905, the recommendation server 122 may instruct the access point 310 to initiate a collection of data for communications received by the access point 310 from the devices 305. The recommendation server 122 may also determine a time duration for the collection of data. Also or alternatively, the collection of data for the received communications may be initiated by a user associated with a premises and/or an agent at a customer call-center.

The collection of data may be triggered or initiated based on detecting that the placement of the access point 310 has changed. The change of placement may be detected by the access point 310 itself or by another device. At step 906, the access point 310 or another device may evaluate whether the collection of received communications was initiated based on a change to the placement of the access point 310. If it is determined that the placement of the access point 310 has not changed, the recommendation server may proceed to step 910. However, if it is determined that the placement of the access point 310 has changed, at step 907, the recommendation server 122 may cause the collected data associated with a previous placement of the access point 310 to be discarded. The recommendation server 122 may proceed to step 910.

At step 910, the access point 310 may monitor for communications received from one or more of the devices 305. At step 915, the access point 310 may determine whether a communication has been received. If the access point 310 has not received a communication, the access point 310 may return to step 910 and continue to monitor for communications from the devices 305. If the access point 310 has received a communication from one of the devices 305, at step 925, the access point 310 may determine a direction, relative to the access point 310, of the received communication. The access point 310 may determine the direction based on determining one or more AoA measurements of one or more signals associated with the received communication, as described above. The access point 310 may also determine additional data for the received communication. For example, the additional data may comprise a duration of connection related to the communication, a date of the communication, a time of the communication, one or more signal strengths of the signals associated with the communication, an identification of the device 305 associated with the received communication, and a type of the device 305 associated with the received communication.

At step 935, the access point 310 may store the data about the relative directions on the access point 310 and/or another device. The access point 310 may send the data to the recommendation server 122 to be stored. Based on receiving the collected data from the access point 310, the recommendation server 122 may further analyze the collected data or store the collected data by interfacing with one or more databases, such as the access point historical data 150 in FIG. 1, via the external network 109.

Figure 9B:
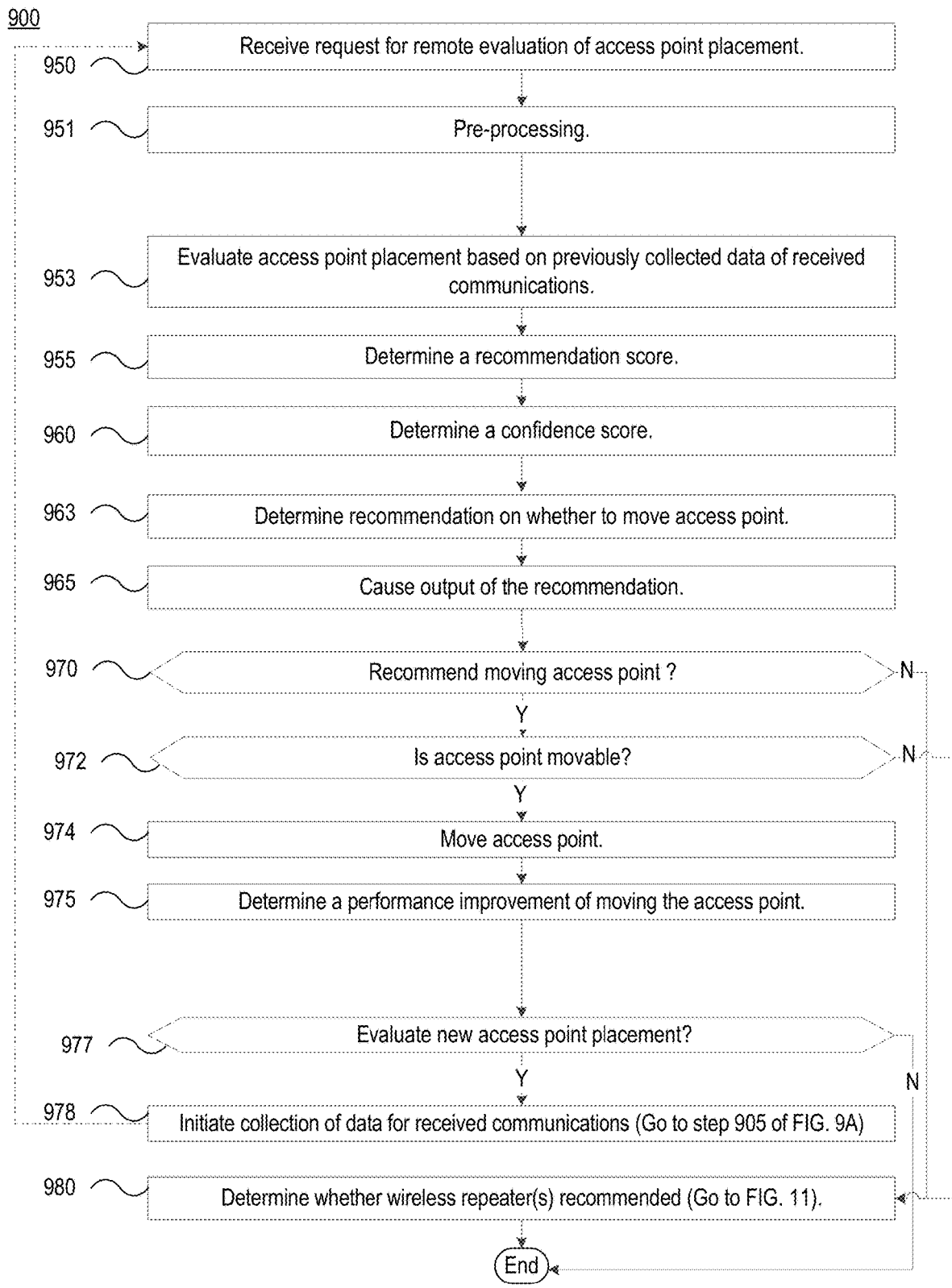
FIG. 9B shows a continuation of the flow diagram in FIG. 9A.

At step 938, the recommendation server 122 may determine whether a request has been received for the stored data. At step 940, based on determining that a request for the stored data has been received, the access point 310 may send the stored data. At step 945, the access point 310 may evaluate whether the time period for the collection of data for received communications has expired. Based on determining that the time period has not expired, the access point 310 may continue to collect data for the received communications by returning to step 910. The access point 310 may continue to perform the steps 910-935 for the period of time set for the collection of data for received communications. However, based on determining that the time period set for the collection of has expired, the access point 310 may proceed to step 950 in FIG. 9B.

At step 950, the access point 310 may receive a request to evaluate the placement of the access point placement 310. For example, the access point 310 may be located within a premises 102, such as the example premises 102a in FIG. 1. A customer associated with the premises 102 may call a customer service center to report wireless performance issues at the premises 102. The customer service center may be associated with a provider of wireless service for the premises 102. A customer service agent at the customer service center may attempt to resolve the customer's issues by requesting a remote evaluation of the placement of the access point 310. A request for remote evaluation of the access point placement may be submitted directly by the customer associated with the premises 102 via a mobile application executing on a user device.

At step 951, the access point 310 may determine any user and device settings relevant for the evaluation. As discussed above, the evaluation may be based on a priority assigned to one or more of the devices 305, user behavior associated with the devices 305, and/or the expected or actual locations of the devices 305.

At step 953, the access point 310 may evaluate a current placement of the access point 310 based on the previously collected data of received communications. At step 955, the access point 310 may determine a recommendation score based on the evaluation of the current placement of the access point 310. At step 960, the access point 310 may determine a confidence score. At step 963, the recommendation server 122 may determine a recommendation on whether to move the access point 310 based on the recommendation score and the confidence score, as described above. Additional information about the premises, such as floorplan information, may be utilized to determine a new location for the access point 310 within the premises or to determine a distance from the current location that the access point 310 should be moved.

At step 965, the access point 310 may cause an output of the recommendation. The recommendation may be output directly by the access point 310. Alternatively or alternatively, the recommendation may be output by a computing device in a customer service center. The recommendation may be output directly to the customer via a mobile application or web browser executing on a user device in communication with the access point 310.

At step 970, the access point 310 may evaluate the recommendation. Based on a recommendation to not move the access point 310, the access point 310 may proceed to step 980 and an additional evaluation, discussed below with reference to FIG. 11, may be performed to evaluate whether the wireless performance may be improved by installing one or more range extending computing devices. However, based on a recommendation to move the access point 310, a technician may be dispatched to the premises 302 to move the access point 310.

At step 972, a user, customer, or technician may evaluate the current placement of the access point 310 and the premises to determine whether the access point 310 is movable. Based on determining that the access point 310 is not movable, at step 980, an additional evaluation, discussed below with reference to FIG. 11, may be performed to evaluate whether the wireless performance may be improved by installing one or more range extending computing devices. However, based on determining that the access point 310 is movable, at step 974, the access point 310 may be moved.

At step 975, a benefit or improvement to the overall wireless performance of moving the access point 310 may be determined. At step 977, based on evaluating the benefit or improvement to the performance, an evaluation of the access point placement may be performed. For example, the performance improvement from moving the access point 310 is negligible, the placement of the access point 310 may be evaluated by initiating a collection of received communications at step 978 and returning to step 950. Steps 950-978 may be repeated iteratively in order to adjust the placement of the access point 310 and evaluate an impact of the adjusted placement on the overall performance. However, if a majority of previously existing performance issues were resolved after moving the access point 310, further evaluation of access point placement may, optionally, be omitted.

Figure 11:
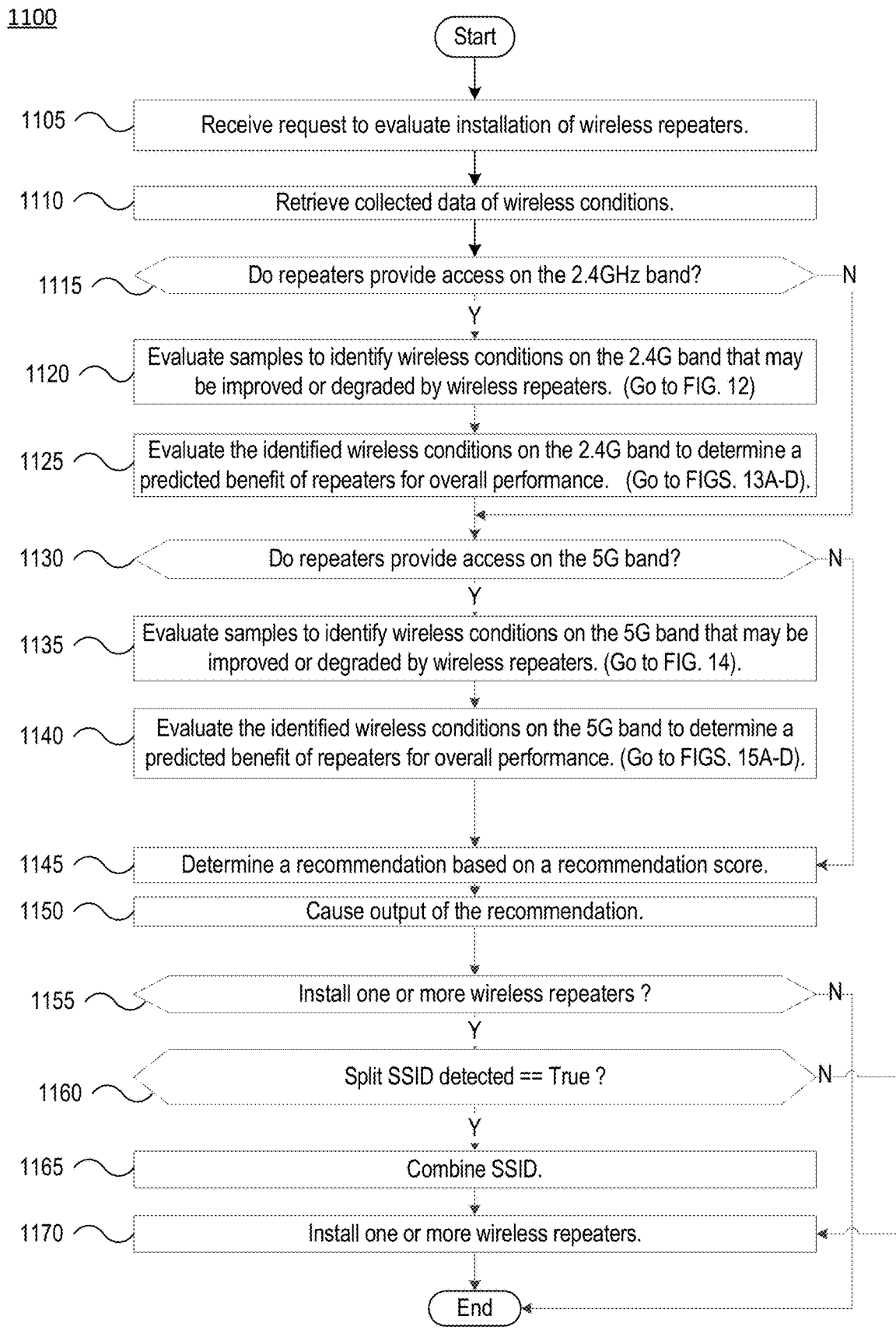
FIG. 11 shows a flow diagram of an example method for evaluating whether the wireless performance for a premises may be improved by installing one or more range extending computing devices.

FIG. 11 shows a flow diagram of an example method 1100 for evaluating whether the wireless performance for a premises may be improved by installing one or more range extending computing devices. The steps of the method 1100 may be performed at step 980 of the method 900 in FIG. 9B described above. The steps of the method 1100 may be performed by the recommendation server 122 shown in FIG. 1. Alternatively or additionally, some or all of the steps of the method 1100 may be performed by one or more other computing devices. Steps of the method 1100 may be modified, omitted, and/or performed in other orders, and/or other steps added.

The data related to the wireless conditions for a premises may be routinely collected for various purposes, such as monitoring a quality of the wireless performance for the premises. Specific networks associated with the premises may be selected for data collection. The data may be collected at specific measurement intervals or time periods, for example, every 14 days. The collected data may comprise one or more samples or snapshots of telemetry data. Each sample may be collected at specific intervals, for example, a sample may be available or collected every 15 or 60 minutes. Multiple samples or snapshots may be received and collected over a period of time. A number of collected samples, the intervals at which the samples are available, and a duration of the samples may be determined based on various factors, such as a length of time needed for collecting a sample, the quality of the collected telemetry data, the type of premises, etc. The telemetry data samples may be stored, for example, in a database, such as the wireless conditions historical data 160.

At step 1105, the recommendation server 122 may receive a request to perform an evaluation of whether the wireless performance for the premises may be improved by installing one or more range extending computing devices. The evaluation may comprise identifying wireless conditions that may be resolved by range extending computing devices, wireless conditions that may be negatively affected by range extending computing devices, and wireless conditions to be resolved prior to installing range extending computing devices. At step 1110, the recommendation server 122 may retrieve previously collected data of wireless conditions for the premises by interfacing with the database of wireless conditions historical data 160 via the network 140.

The range extending computing devices may provide access on one or both of the 2.4G and 5G bands, and therefore, the telemetry data samples may be evaluated separately for each frequency band. Differences between the 5G and 2.4G bands include range and bandwidth. The longer waves used by the 2.4G band may be better suited to longer ranges and transmission through walls and solid objects. However, the 2.4G band is often utilized by common electronic devices such as garage door openers, baby monitors, and others. Because so many devices use the 2.4G band, the resulting congestion may cause more dropped connections and lower than expected speeds. The 5G band may be less congested, resulting in more stable connections and higher speeds. The shorter waves used by the 5G band may be less able to penetrate walls and solid objects and thus, have a shorter effective range than the longer waves used by the 2.4G band. However, the shorter effective range of used by the 5G band may be extended through the use of range extending computing devices.

At step 1115, the recommendation server 122 may determine whether the repeaters provide access on the 2.4G band. Based on determining that the repeaters do not provide access on the 2.4G band, the recommendation server 122 may, at step 1130, determine whether the repeaters provide access on the 5G band. However, based on determining that the repeaters provide access on the 2.4G band, the recommendation server 122 may, at step 1120, evaluate each of the telemetry data samples within the previously collected data of wireless conditions for the premises to identify wireless conditions on the 2.4G band that may be improved or degraded by the addition of repeaters, as described in greater detail below with reference to FIG. 12. At step 1125, the recommendation server 122 may evaluate the identified wireless conditions on the 2.4G band to determine a predicted benefit of repeaters on the overall wireless performance, as described in greater detail below with reference to FIGS. 13A-13D. The predicted benefit on overall performance may be determined as a recommendation score.

At step 1130, the recommendation server 122 may determine whether the repeaters provide access on the 5G band. At step 1135, based on determining that the repeaters provide access on the 5G band, the recommendation server 122 may evaluate each of the telemetry data samples to identify wireless conditions on the 5G band that may be improved or degraded by the addition of repeaters, as described in greater detail below with reference to FIG. 14. At step 1140, the recommendation server 122 may evaluate the identified wireless conditions on the 5G band to determine a predicted benefit of repeaters on the overall wireless performance, as described in greater detail below with reference to FIGS. 15A-15D.

At step 1145, the recommendation server 122 may determine a recommendation on whether to install repeaters based on the recommendation score. At step 1150, the recommendation server 122 may cause output of the recommendation. The recommendation may be output via the access point 310, a mobile application executing on a user device, and/or an application executing on a computing device at a customer service center. The recommendation may also comprise the recommendation score. At step 1155, the recommendation server 122 may evaluate the recommendation. Based on a recommendation to install repeaters, at step 1160, the recommendation server 122 may determine whether split SSID is enabled for the access point 310. Based on determining that the split SSID is enabled for the access point 310, at step 1165, as part of the repeater onboarding process, the customer/user may be asked to combine the SSID. At step 1170, one or more range extending computing devices may be installed within the premises.

At step 1120, the recommendation server 122 may evaluate each of the telemetry data samples within the previously collected data of wireless conditions for the premises to identify wireless conditions on the 2.4G band that may be improved or degraded by the addition of repeaters, as described in greater detail below with reference to FIG. 12. At step 1125, the recommendation server 122 may evaluate the identified wireless conditions on the 2.4G band to determine a predicted benefit of repeaters on the overall wireless performance, as described in greater detail below with reference to FIGS. 13A-13D.

Figure 12:
FIG. 12 shows a flow diagram of an example method for evaluating telemetry data samples to identify wireless conditions on the 2.4G band.
Figure 13A:
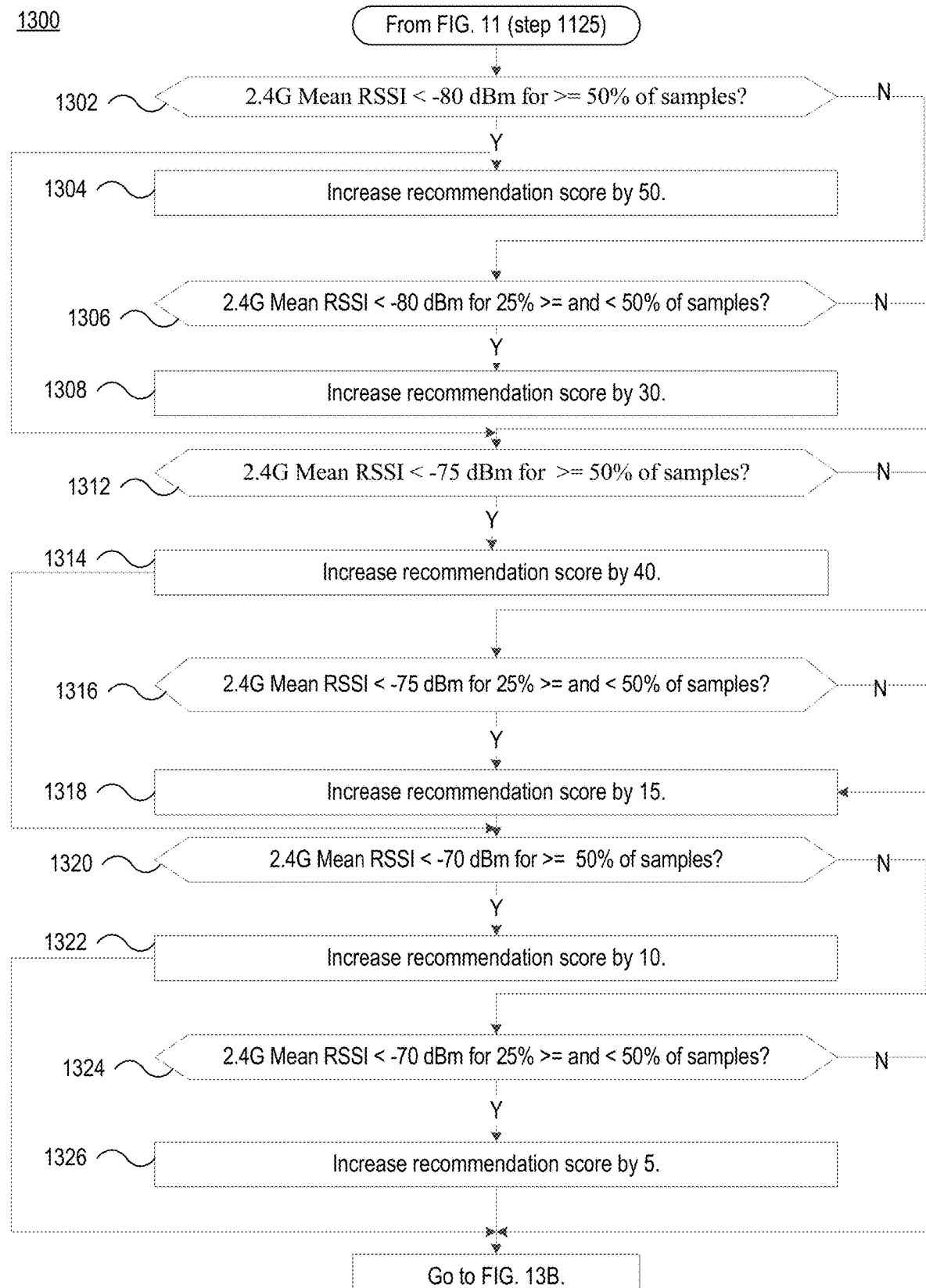
FIGS. 13A-D show flow diagrams of an example method for evaluating wireless conditions on the 2.4G band to determine whether to install one or more range extending computing devices.
Figure 13B:
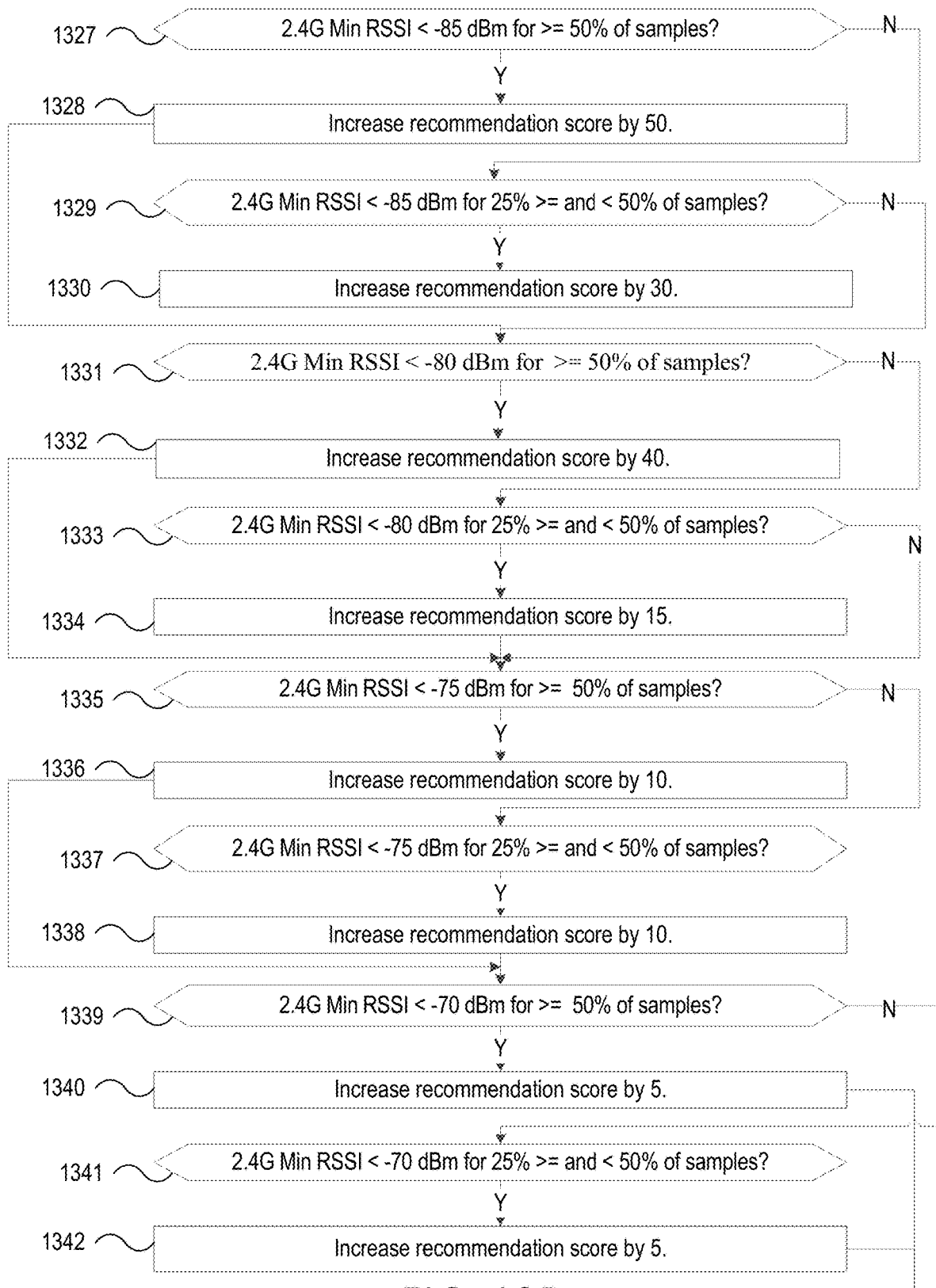
Figure 13C:
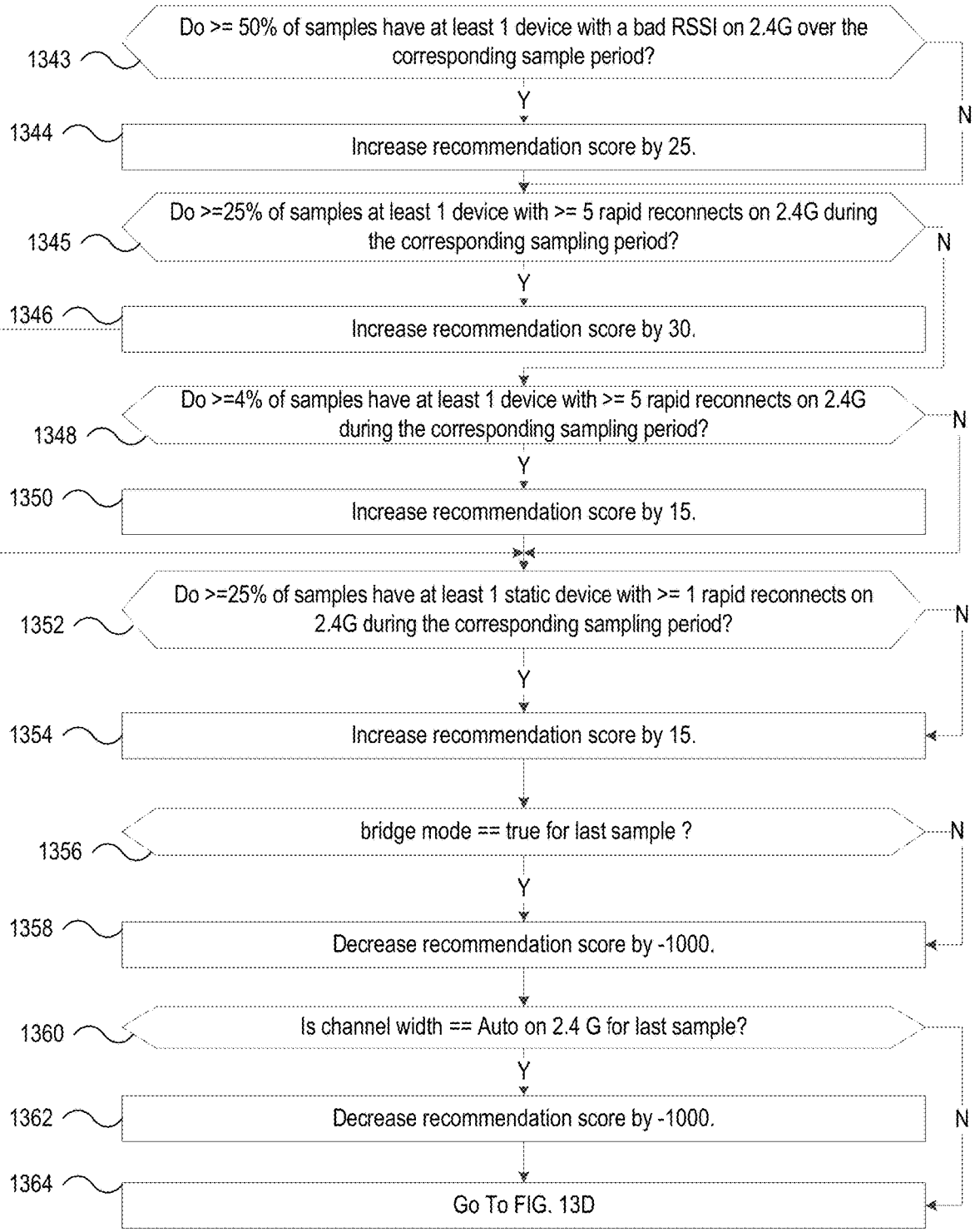
Figure 13D:
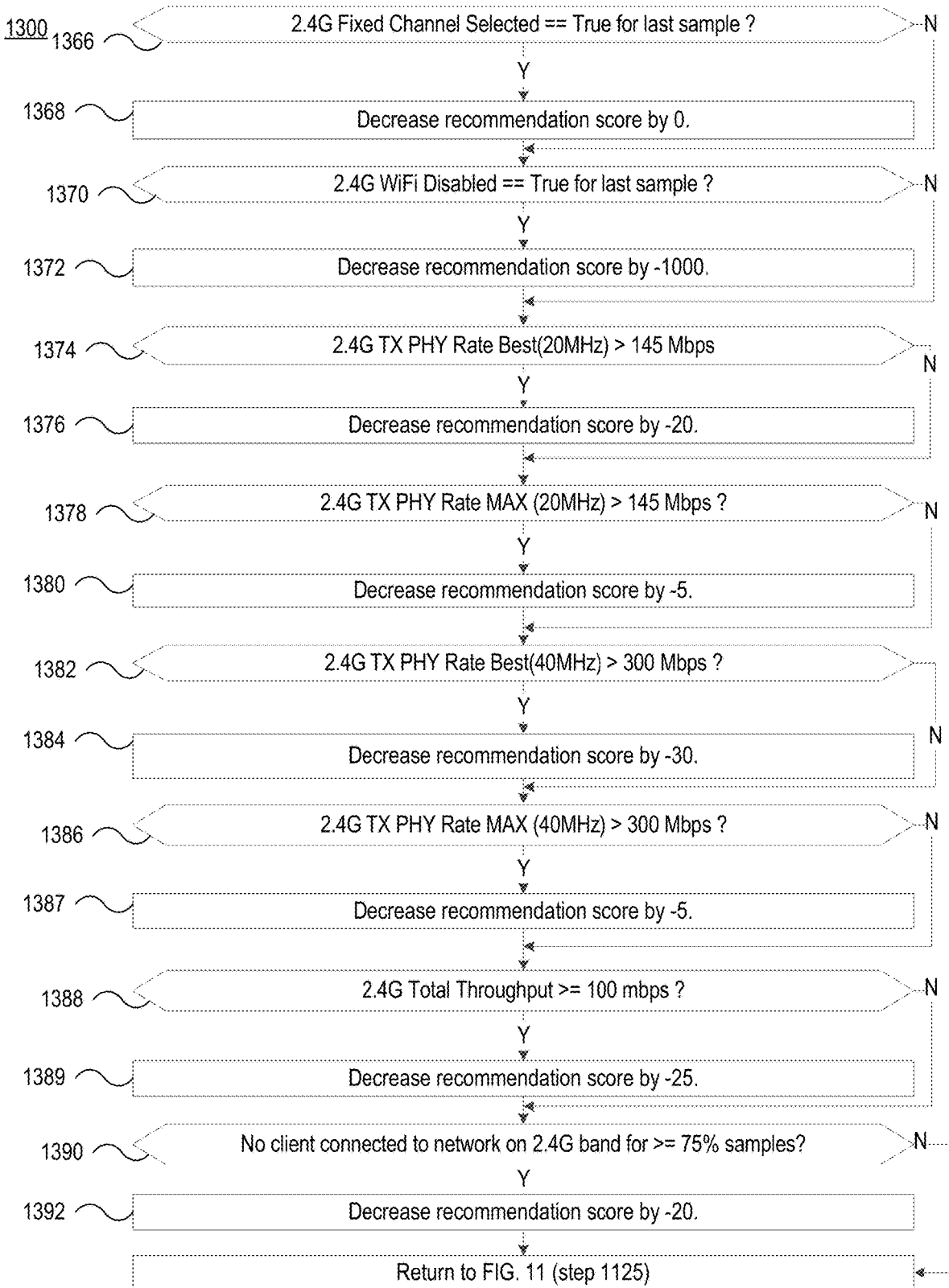

FIG. 12 shows a flow diagram of an example method 1200 for evaluating each of the telemetry data samples within the previously collected data of wireless conditions for the premises to identify wireless conditions on the 2.4G band that may be improved or degraded by the addition of repeaters, as described above with reference to step 1120 of FIG. 11. The steps of the method 1200 may be performed by the recommendation server 122 shown in FIG. 1. Alternatively or additionally, some or all of the steps of the method 1200 may be performed by one or more other computing devices. Steps of the method 1200 may be modified, omitted, and/or performed in other orders, and/or other steps added.

At step 1205, the recommendation server 122 may retrieve a next telemetry data sample from the previously collected data of wireless conditions for the premises. The telemetry data sample may comprise a snapshot of wireless conditions over a duration of a sampling period. For example, the data sample may comprise the signal strength measurements associated with the devices 305 during the corresponding sampling period. The signal strength measurements in the data sample may be expressed as received signal strength indicator (RSSI) values. RSSI is typically expressed in decibels relative to a milliwatt (dBm) from zero dBm to −120 dBm. The RSSI value of a signal may be indicative of a quality of the signal. For example, an RSSI value that is closer to zero indicates a stronger signal strength. An RSSI value less than −80 dBm may be unusable, depending on additional factors, such as noise.

At step 1210, the recommendation server 122 may evaluate the RSSI measurements in the data sample to determine a maximum RSSI value on the 2.4G band for the data sample. At step 1215, the recommendation server 122 may evaluate the RSSI measurements in the retrieved sample to determine a mean of the RSSI values on the 2.4G band. At step 1230, the recommendation server 122 may determine, a minimum amount of time during the sampling period when a signal strength (RSSI) on the 2.4G band associated with a device 305 is less than a threshold RSSI value set for an unacceptably low signal strength.

At step 1235, the recommendation server 122 may evaluate the data sample to determine a number of devices 305 that reconnected to the wireless network on the 2.4G band during the sampling period. At step 1240, the recommendation server 122 may determine a channel width utilized by the access point 310 on the 2.4G band during the sampling period. The channel width may be set to 20 or 40 MHz. An amount of data transferred on a signal associated with a frequency band may be affected by the channel width. A 40 MHz channel width may allow for greater speed and faster data transfer rates than a 20 MHz channel width.

At step 1245, the recommendation server 122 may determine, for the retrieved data sample, the highest reported physical layer (PHY) rate (also referred to as "TX PHY Rate Best") used to transmit data on the 2.4G band to any device 305 on the network using the determined channel width. At step 1250, the recommendation server 122 may determine, for the retrieved data sample, the TX PHY Rate MAX reported for a device 305 when the network is using the determined channel width on the 2.4G band. The TX PHY Rate MAX may be the highest maximum theoretical PHY rate reported for any device 305 in a data sample when the network is using the 20 MHz channel width on the 2.4G band.

At step 1255, the recommendation server 122 may evaluate, for the retrieved sample, a throughput of the network. The recommendation server 122 may evaluate transmission/receiver throughput values over the sampling period (or telemetry interval). At step 1256, the recommendation server 122 may determine, for the retrieved data sample, a number of devices 305 that were connected to the wireless network on the 2.4G band during the sampling period.

At step 1260, the recommendation server 122 may determine whether the retrieved data sample is the last data sample of the collected data. Based on determining that the retrieved data sample is not the last data sample, the recommendation server 122 may return to step 1205 and retrieve the next data sample of the collected data. The recommendation server 122 may repeat the steps 1205 through 1260 for each of the data samples in the collected data.

Based on determining that the retrieved sample is the last data sample, the recommendation server 122 may determine, at step 1265 and based on the last data sample, whether the access point 310 was operating in bridge mode. At step 1270, the recommendation server 122 may determine, based on the last data sample, whether WiFi on the 2.4G band was disabled. The recommendation server 122 may return to step 1120 of the method 1100 in FIG. 11.

FIGS. 13A-D show flow diagrams of an example method 1300 for evaluating the wireless conditions on the 2.4G band that were identified by method 1200 in FIG. 12 in order to determine a predicted benefit of repeaters on the overall wireless performance, as described above with reference to step 1125 of the method 1100 in FIG. 11. The steps of the method 1300 may be performed by the recommendation server 122 shown in FIG. 1. Alternatively or additionally, some or all of the steps of the method 1300 may be performed by one or more other computing devices. Steps of the method 1300 may be modified, omitted, and/or performed in other orders, and/or other steps added. For example, one or more steps of FIGS. 13A-D may be performed by a machine learning system based on reinforcement/bandit algorithms that may provide recommendation scores such that one or more indicators of customer satisfaction are optimized. The example criteria, weights, and other values described below and in connection with FIGS. 13A-13D and Tables 4-7 are not limiting. Different weights and/or other values may be used in connection with any of those example criteria. Less than all of those criteria may be used, and/or other criteria may be used.

Range extending computing devices may have an overall positive impact on wireless network performance, for example, by improving poor signal strength and device connectivity. However, range extending computing devices may also have a negative impact on network bandwidth and speed. Therefore, the recommendation server 122 may evaluate the wireless conditions identified in the method 1200 in FIG. 12 based on one or more evaluation criteria in order to determine a predicted benefit of range extending computing devices on the overall network performance. The predicted benefit may be provided as a recommendation score. The recommendation score may be a relative score and comprise a value between 0 and 100.

The recommendation server 122 may evaluate the mean RSSI on the 2.4G band determined for data samples in step 1215 of FIG. 12. Table 4 shows example evaluation criteria for evaluating the mean RSSI and their relative impact on the recommendation score. The relative impact of an evaluation criteria may be indicated as a weight that may be utilized for increasing or decreasing the recommendation score. If poor signal strength (RSSI) is indicated for a larger portion of the data samples, adding range extending computing devices may result in a greater overall performance improvement than if poor signal strength (RSSI) is indicated for a smaller portion of the data samples. Thus, poor signal strength across a larger number of data samples may increase the recommendation score more than poor signal strength across a smaller number of samples.

TABLE 4

| Criterion | Evaluation of Criterion | Weight |
| --- | --- | --- |
| 2.4G Mean RSSI <−80 dBm | >=50% of samples | 50 |
| 2.4G Mean RSSI <−80 dBm | >=25% and <50% of samples | 30 |
| 2.4G Mean RSSI <−75 dBm | >=50% of samples | 40 |
| 2.4G Mean RSSI <−75 dBm | >=25% and <50% of samples | 15 |
| 2.4G Mean RSSI <−70 dBm | >=50% of samples | 10 |
| 2.4G Mean RSSI <−70 dBm | >=25% and <50% of samples | 5 |

As shown in Table 4, if the mean RSSI on the 2.4G band is less than −80 dBm for at least 50% of the telemetry data samples, a relative performance benefit of adding range extending computing devices may be represented by a weight of 50. At step 1302, the recommendation server 122 may evaluate whether at least 50% of the samples have a mean RSSI that is less than −80 dBm. If at least 50% of the samples have a mean RSSI that is less than −80 dBm, the recommendation server 122 may, at step 1304, increase the recommendation score by utilizing the weight of 50.

As shown in Table 4, if the mean RSSI on the 2.4G band is less than −80 dBm for more than at least 25% and less than 50% of the samples, a relative performance benefit of adding range extending computing devices may be represented by a weight of 30. At step 1306, the recommendation server 122 may evaluate whether a at least 25% and less than 50% of the samples have a mean RSSI that is less than −80 dBm. If at least 50% of the samples have a mean RSSI that is less than −80 dBm, the recommendation server 122 may, at step 1308, increase the recommendation score by utilizing the weight of 30.

As shown in Table 4, if the mean RSSI on the 2.4G band is less than −75 dBm for over 50% of the data samples, a relative performance benefit of adding range extending computing devices may be represented by a weight of 40. At step 1312, the recommendation server 122 may evaluate whether at least 50% of the samples have a mean RSSI that is less than −75 dBm. If at least 50% of the samples have a mean RSSI that is less than −75 dBm, the recommendation server 122 may, at step 1314, increase the recommendation score based on utilizing a weight of 40.

As shown in Table 4, if the mean RSSI on the 2.4G band is less than −75 dBm for more than at least 25% and less than 50% of the samples, a relative performance benefit of adding range extending computing devices may be represented by a weight of 15. At step 1316, the recommendation server 122 may evaluate whether more than at least 25% and less than 50% of the samples have a mean RSSI that is less than −75 dBm. If at least 50% of the samples have a mean RSSI that is less than −75 dBm, the recommendation server 122 may, at step 1318, increase the recommendation score based on utilizing a weight of 15.

As shown in Table 4, if the mean RSSI on the 2.4G band is less than −70 dBm for over 50% of the data samples, a relative performance benefit of adding range extending computing devices may be represented by a weight of 10. At step 1320, the recommendation server 122 may evaluate whether at least 50% of the samples have a mean RSSI that is less than −70 dBm. If at least 50% of the samples have a mean RSSI that is less than −70 dBm, the recommendation server 122 may, at step 1322, increase the recommendation score based on utilizing a weight of 10.

As shown in Table 4, if the mean RSSI on the 2.4G band is less than −70 dBm for more than at least 25% and less than 50% of the samples, a relative performance benefit of adding range extending computing devices may be represented by a weight of 5. At step 1324, the recommendation server 122 may evaluate whether at least 25% and less than 50% of the samples have a mean RSSI that is less than −70 dBm. If more than at least 25% and less than 50% of the samples have a mean RSSI that is less than −70 dBm, the recommendation server 122 may, at step 1326, increase the recommendation score based on utilizing a weight of 5.

Table 5 shows example evaluation criteria for the minimum RSSI of the data samples on the 2.4G band and their relative impact on the predicted benefit or recommendation score. As shown in Table 5, if the minimum RSSI on the 2.4G band is less than −85 dBm for over 50% of the data samples, a relative performance benefit of adding range extending computing devices may be represented by a weight of 50. At step 1327, the recommendation server 122 may evaluate whether at least 50% of the samples have a minimum RSSI that is less than −85 dBm. If at least 50% of the samples have a minimum RSSI that is less than −85 dBm, the recommendation server 122 may, at step 1328, increase the recommendation score based on utilizing a weight of 50.

As shown in Table 5, if the minimum RSSI on the 2.4G band is less than −85 dBm for more than at least 25% and less than 50% of the samples, a relative performance benefit of adding range extending computing devices may be represented by a weight of 30. At step 1329, the recommendation server 122 may evaluate whether at least 25% and less than 50% of the samples have a minimum RSSI that is less than −85 dBm. Based on the evaluation, the recommendation server 122 may, at step 1330, increase the recommendation score based on utilizing a weight of 30.

TABLE 5

| Criterion | Evaluation of Criterion | Weight |
| --- | --- | --- |
| 2.4G Min RSSI <−85 dBm | >=50% of samples | 50 |
| 2.4G Min RSSI <−85 dBm | >=25% and <50% of samples. | 30 |
| 2.4G Min RSSI <−80 dBm | >=50% of samples. | 40 |
| 2.4G Min RSSI <−80 dBm | >=25% and <50% of samples. | 15 |
| 2.4G Min RSSI <−75 dBm | >=50% of samples. | 10 |
| 2.4G Min RSSI <−75 dBm | >=25% and <50% of samples. | 10 |
| 2.4G Min RSSI <−70 dBm | >=50% of samples. | 5 |
| 2.4G Min RSSI <−70 dBm | >=25% and <50% of samples. | 5 |

As shown in Table 5, if the minimum RSSI on the 2.4G band is less than −80 dBm for over 50% of the data samples, a relative performance benefit of adding range extending computing devices may be represented by a weight of 40. At step 1331, the recommendation server 122 may evaluate whether at least 50% of the samples have a minimum RSSI that is less than −80 dBm. Based on the evaluation, the recommendation server 122 may, at step 1332, increase the recommendation score based on utilizing a weight of 40.

As shown in Table 5, if the minimum RSSI on the 2.4G band is less than −80 dBm for more than at least 25% and less than 50% of the samples, a relative performance benefit of adding range extending computing devices may be represented by a weight of 15. At step 1333, the recommendation server 122 may evaluate whether more than at least 25% and less than 50% of the samples have a minimum RSSI that is less than −80 dBm. Based on the evaluation, the recommendation server 122 may, at step 1334, increase the recommendation score based on utilizing a weight of 15.

As shown in Table 5, if the minimum RSSI on the 2.4G band is less than −75 dBm for over 50% of the data samples, adding range extending computing devices may have a negligible predicted benefit for the overall performance, and a relative performance benefit of adding range extending computing devices may be represented by a weight of 10. At step 1335, the recommendation server 122 may evaluate whether at least 50% of the samples have a minimum RSSI that is less than −75 dBm. If at least 50% of the samples have a minimum RSSI that is less than −75 dBm, the recommendation server 122 may, at step 1336, increase the recommendation score based on utilizing a weight of 10.

As shown in Table 5, if the minimum RSSI on the 2.4G band is less than −75 dBm for more than at least 25% and less than 50% of the samples, adding range extending computing devices may have an equally negligible benefit for the overall performance as when at least 50% of the samples have a minimum RSSI that is less than −75 dBm, and a relative performance benefit of adding range extending computing devices may be represented by a weight of 10. At step 1337, the recommendation server 122 may evaluate whether more than at least 25% and less than 50% of the samples have a minimum RSSI that is less than −75 dBm. If more than at least 25% and less than 50% of the samples have a minimum RSSI that is less than −75 dBm, the recommendation server 122 may, at step 1338, increase the recommendation score based on utilizing a weight of 10.

As shown in Table 5, if the minimum RSSI on the 2.4G band is less than −70 dBm for over 50% of the data samples, adding range extending computing devices may have a may have a negligible predicted benefit for the overall performance, and a relative performance benefit of adding range extending computing devices may be represented by a weight of 5. At step 1339, the recommendation server 122 may evaluate whether at least 50% of the samples have a minimum RSSI that is less than −70 dBm. If at least 50% of the samples have a minimum RSSI that is less than −70 dBm, the recommendation server 122 may, at step 1340, adjust the recommendation score based on the assigned weight of 5.

As shown in Table 5, if the minimum RSSI on the 2.4G band is less than −70 dBm for more than at least 25% and less than 50% of the samples, adding range extending computing devices may have an equally negligible benefit for the overall performance as when at least 50% of the samples have a minimum RSSI that is less than −70 dBm, and a relative performance benefit of adding range extending computing devices may be represented by a weight of 5. At step 1341, the recommendation server 122 may evaluate whether more than at least 25% and less than 50% of the samples have a minimum RSSI that is less than −70 dBm. If more than at least 25% and less than 50% of the samples have a minimum RSSI that is less than −70 dBm the recommendation server 122 may, at step 1342, increase the recommendation score by utilizing a weight of 5.

As discussed above, at step 1230, the recommendation server 122 may determine, for the data samples, a minimum amount of time during the corresponding sampling period when a signal strength (RSSI) on the 2.4G band associated with a device 305 is less than a threshold RSSI value set for an unacceptably low signal strength. Table 6 shows example evaluation criteria related to device connectivity on the 2.4G band and their relative impact on the recommendation score.

As shown in Table 6, if at least 50% of the samples have at least one device 305 with a RSSI less than the threshold RSSI value set for an unacceptably low signal strength, a relative performance benefit of adding range extending computing devices may be represented by a weight of 25. At step 1343, the recommendation server 122 may evaluate whether at least 50% of the samples have at least one device 305 with a RSSI less than the threshold RSSI value set for an unacceptably low signal strength. Based on the evaluation, the recommendation server 122 may, at step 1344, increase the recommendation score based on utilizing a weight of 25.

TABLE 6

| Criterion | Evaluation of Criterion | Weight |
|---|---|---|
| 2.4G Minimum time that client device is in bad RSSI is equal to the sample time. | At least 1 device has bad RSSI = telemetry sample time for >=50% of samples | 25 |
| 2.4G Client Device Rapid Reconnects >=5 | At least 1 client device has >=5 rapid reconnect events for >=25% of samples. | 30 |
| 2.4G Client Device Rapid Reconnects >=5 | At least 1 client device has >=5 rapid reconnect events for >=4% of samples. | 15 |
| 2.4G Static (not mobile) Client Device Rapid Reconnects >=1 | At least 1 static client device (requires fingerprinting) has >=1 rapid reconnect events for >=25% of samples. | 15 |

As discussed above with reference to FIG. 12, the recommendation server 122 may evaluate each data sample to determine a number of devices 305 that reconnected to the wireless network on the 2.4G band during the corresponding sampling period. As shown in Table 6, if at least 25% of the samples had at least one device 305 that experienced at least 5 reconnects to the network during their corresponding sampling periods, the addition of repeaters may have an overall benefit by improving the connectivity for the devices 305, and a relative performance benefit of adding range extending computing devices may be represented by a weight of 30. At step 1345, the recommendation server 122 may evaluate whether at least 25% of the data samples had at least one device 305 that experienced at least 5 reconnects to the network during the corresponding sampling periods. Based on the evaluation, the recommendation server 122 may, at step 1346, increase the recommendation score based on utilizing a weight of 30.

As shown in Table 6, if at least 4% of the samples had at least one device 305 that experienced at least 5 reconnects to the network during their corresponding sampling periods, the addition of repeaters may have an overall benefit by improving the connectivity for the devices 305, and a relative performance benefit of adding range extending computing devices may be represented by a weight of 5. At step 1348, the recommendation server 122 may evaluate whether at least 4% of the data samples had at least one device 305 that experienced at least 5 reconnects to the network during the corresponding sampling periods. Based on the evaluation, the recommendation server 122 may, at step 1350, increase the recommendation score based on utilizing a weight of 5.

As shown in Table 6, if at least 25% of the samples had at least one static device 305 that experienced at least 1 reconnect to the network during their corresponding sampling periods, the addition of repeaters may have a lesser overall benefit on performance by improving connectivity, and a relative performance benefit of adding range extending computing devices may be represented by a weight of 15. At step 1352, the recommendation server 122 may evaluate whether at least 25% of the samples have at least one static device 305 with at least one reconnect to the network during the corresponding sampling periods. Based on the evaluation, the recommendation server 122 may, at step 1354, increase the recommendation score by utilizing a weight of 15.

As discussed above, adding range extending computing devices may degrade overall performance in some cases. By operating in bridge mode, two or more wireless access points may communicate with each other and join their respective local networks. However, depending on an amount of cross-network communication, access points that operate in bridge mode may generate a substantial amount of network traffic. Further, the bandwidth of the wireless devices connected to these access points may be consistent with the bandwidth of the bridge devices. As a result, overall network performance may be lower if an access point is operating in bridge mode than if it is not. As shown in the example criteria of Table 7, if the access point 310 operates in bridge mode, the addition of repeaters may degrade the overall performance, and a relative performance benefit of adding range extending computing devices may be represented by a weight of −1000. As described above, at step 1265 of FIG. 12, the recommendation server 122 may, based on the last data sample, determine whether the access point 310 was operating in bridge mode. At step 1356, the recommendation server 122 may evaluate whether the access point 310 was operating in bridge mode. Based on the evaluation at step 1356, the recommendation server 122 may, at step 1358, decrease the recommendation score based on utilizing a weight of −1000.

As described above, at step 1270 of FIG. 12, the recommendation server 122 may determine, based on the last telemetry data sample, the setting of the channel width on the 2.4G band, a selection of fixed channel, and a status of WiFi on the 2.4G band. As shown in Table 7, if the channel width on the 2.4G band was set to "Auto," the addition of repeaters may degrade the overall performance, and a relative performance benefit of adding range extending computing devices may be represented by a weight of −1000. At step 1360, the recommendation server 122 may evaluate whether the channel width on the 2.4G band was set to "Auto." Based on the evaluation, the recommendation server 122 may, at step 1362, decrease the recommendation score based on utilizing a weight of −1000.

If a fixed channel is selected on the 2.4G band, installing repeaters may disable fixed/manual channel selection and instead utilize DCS mode. As shown in Table 7, if a fixed channel is selected on the 2.4G band, the addition of repeaters may degrade the overall performance, and a relative performance benefit of adding range extending computing devices may be represented by a weight of −1000. At step 1366, the recommendation server 122 may evaluate whether a fixed channel is selected. Based on the evaluation, the recommendation server 122 may, at step 1368, decrease the recommendation score based on utilizing a weight of 0.

TABLE 7

| Criterion | Evaluation of Criterion | Weight |
| --- | --- | --- |
| Bridge Mode | Bridge Mode == True for last reported telemetry sample at the end of the measurement interval (or most recent sample). | −1000 |
| 2.4G Channel width <> Auto | Last reported telemetry sample at the end of the measurement interval. | −1000 |
| 2.4G Fixed Channel Selected | Fixed Channel Selected == True for last reported telemetry sample at the end of the measurement interval. | 0 |
| 2.4G WiFi Disabled | WiFi Disabled == True for last reported telemetry sample at the end of the measurement interval. | −1000 |
| 2.4G TX PHY Rate Best(channel width 20 MHz) >145 Mbps | At least 1 occurrence detected over the measurement interval (e.g., across all data samples). | −20 |
| 2.4G TX PHY Rate MAX (channel width 20 MHz) >145 Mbps | At least 1 occurrence detected over the measurement interval (e.g., across all data samples). | −5 |
| 2.4G TX PHY Rate Best(channel width 40 MHz) >300 Mbps | At least 1 occurrence detected over the measurement interval (e.g., across all data samples). | −30 |
| 2.4G TX PHY Rate MAX (channel width 40 MHz) >300 Mbps | At least 1 occurrence detected over the measurement interval (e.g., across all samples). | −5 |
| 2.4G Total Throughput >=100 Mbps | At least 1 occurrence detected over the measurement interval (e.g., across all samples). | −25 |
| No devices connected using WiFi on 2.4G. | >=75% of samples reported over the measurement interval. | −20 |

As shown in Table 7, if wireless on the 2.4G was disabled, the addition of extenders may degrade the overall performance, and a relative performance benefit of adding range extending computing devices may be represented by a weight of −1000. At step 1370, the recommendation server 122 may evaluate whether wireless on the 2.4G band was disabled. Based on the evaluation, the recommendation server 122 may, at step 1372, alter the recommendation score based on utilizing a weight of −1000.

The recommendation score may be based on an evaluation of the highest reported PHY rate (referred to as "TX PHY Rate Best") used for transmitting data to any of the devices 305 on the network using the 20 MHz channel width. As discussed above with reference to FIG. 12, at step 1245, the recommendation server 122 may determine the maximum PHY rate for the data samples on the 20 MHz or 40 MHz channel width. Although rates above the TX PHY Rate Best may be supported by the access point 310 and the devices 305, they may be unsupported by the range extending computing devices. If the repeaters do not support the TX PHY Rate Best reported in the data samples, adding repeaters may degrade the overall network performance. As shown in Table 7, if there is at least one occurrence of TX PHY Rate Best that is greater than a threshold value of 145 Mbps, the recommendation score may be decreased by a weight of −20. The threshold value may be based on the highest rate supported by the range extending computing devices. At step 1374 the recommendation server 122 may evaluate the TX PHY Rate Best of the data samples to determine whether there is at least one occurrence of TX PHY Rate Best that is greater than 145 Mbps. Based on determining that there is at least one occurrence of TX PHY Rate Best that is greater than 145 Mbps, the recommendation server, at step 1376 may decrease the recommendation score by utilizing a weight of −20.

The recommendation score may be based on an evaluation of the highest reported PHY rate (referred to as "TX PHY Rate MAX") used for transmitting data to any of the devices 305 on the network using the 20 MHz channel width. As discussed above with reference to FIG. 12, at step 1245, the recommendation server 122 may determine the maximum PHY rate for the data samples on the 20 MHz or 40 MHz channel width. Although rates above the TX PHY Rate MAX may be supported by the access point 310 and the devices 305, they may be unsupported by the range extending computing devices. If the repeaters do not support the TX PHY Rate MAX reported in the data samples, adding repeaters may degrade the overall network performance. As shown in Table 7, if there is at least one occurrence of TX PHY Rate Best that is greater than a threshold value of 145 Mbps, the recommendation score may be decreased by a weight of −5. The threshold value may be based on the highest rate supported by the range extending computing devices. At step 1378 the recommendation server 122 may evaluate the TX PHY Rate MAX for the data samples on the 20 MHz channel to determine whether there is at least one occurrence of TX PHY Rate MAX that is greater than 145 Mbps. Based on determining that there is at least one occurrence of TX PHY Rate MAX that is greater than 145 Mbps, the recommendation server, at step 1376 may decrease the recommendation score by utilizing a weight of −5.

As shown in Table 7, if there is at least one occurrence of TX PHY Rate Best that is greater than a threshold value of 145 Mbps, the recommendation score may be decreased by a weight of −20. The threshold value may be based on the highest rate supported by the range extending computing devices. At step 1380 the recommendation server 122 may evaluate the TX PHY Rate Best of the data samples to determine whether there is at least one occurrence of TX PHY Rate Best that is greater than 145 Mbps. Based on determining that there is at least one occurrence of TX PHY Rate Best that is greater than 145 Mbps, the recommendation server, at step 1382 may decrease the recommendation score by utilizing a weight of −20.

As shown in Table 7, if there is at least one occurrence of TX PHY Rate MAX that is greater than a threshold value of 300 Mbps, the recommendation score may be decreased by a weight of −5. The threshold value may be based on the highest rate supported by the range extending computing devices on the 40 MHz channel of the 2.4G band. At step 1384 the recommendation server 122 may evaluate the TX PHY Rate MAX for the data samples on the 20 MHz channel to determine whether there is at least one occurrence of TX PHY Rate MAX that is greater than 300 Mbps. Based on determining that there is at least one occurrence of TX PHY Rate MAX that is greater than 300 Mbps, the recommendation server, at step 1386 may decrease the recommendation score by utilizing a weight of −5.

The recommendation score may be based on an evaluation of the total throughput for the network reported in the data samples. Transmission/receiver throughput values that are greater than or equal to 100 Mbps may be difficult or unlikely to be supported by range extending computing devices, especially on 2.4G backhaul links. As shown in Table 7, if there is at least one occurrence of TX PHY Rate MAX that is greater than a threshold value of 300 Mbps, the recommendation score may be decreased by a weight of −5. The sample time of the data sample may be at least 15 minutes. At step 1388, the recommendation server 122 may evaluate the total throughput on the 2.4G band determined for the data samples in FIG. 12. Based on determining that there is at least one occurrence of total throughput that is greater than or equal to 300 Mbps, the recommendation server may, at step 1389, decrease the recommendation score by utilizing a weight of −25.

The recommendation score may be based on a number of devices 305 that were connected to the network on the 2.4G band. As discussed above with reference to FIG. 12, at step 1256 of the method 1200, the recommendation server 122 may determine, for the retrieved data sample, a number of devices 305 that were connected to the wireless network on the 2.4G band during the sampling period. As shown in Table 7, no devices 305 were connected to the network on the 2.4G band for at least 75% of the data samples, the recommendation score may be decreased by a weight of −20. At step 1390, the recommendation server 122 may evaluate whether there were no devices 305 connected to the network on the 2.4G band for at least 75% of the data samples. Based on the evaluation, the recommendation server 122 may, at step 1392, decrease the recommendation score by utilizing a weight of −20, and the recommendation server 122 may return to step 1125 of FIG. 11.

A machine learning algorithm may be trained on the wireless conditions data collected from multiple other premises to analyze the wireless conditions for a particular premises and provide recommendations. In some examples, data collected across various similar form factor premises may be analyzed to discover previous patterns and range extending computing device placements that may also be useful for providing recommendations on installing range extending computing devices. For example, one or more steps of FIGS. 13A-D may be performed by a machine learning system based on reinforcement/bandit algorithms that may provide recommendation scores such that one or more indicators of customer satisfaction are optimized.

Figure 14:
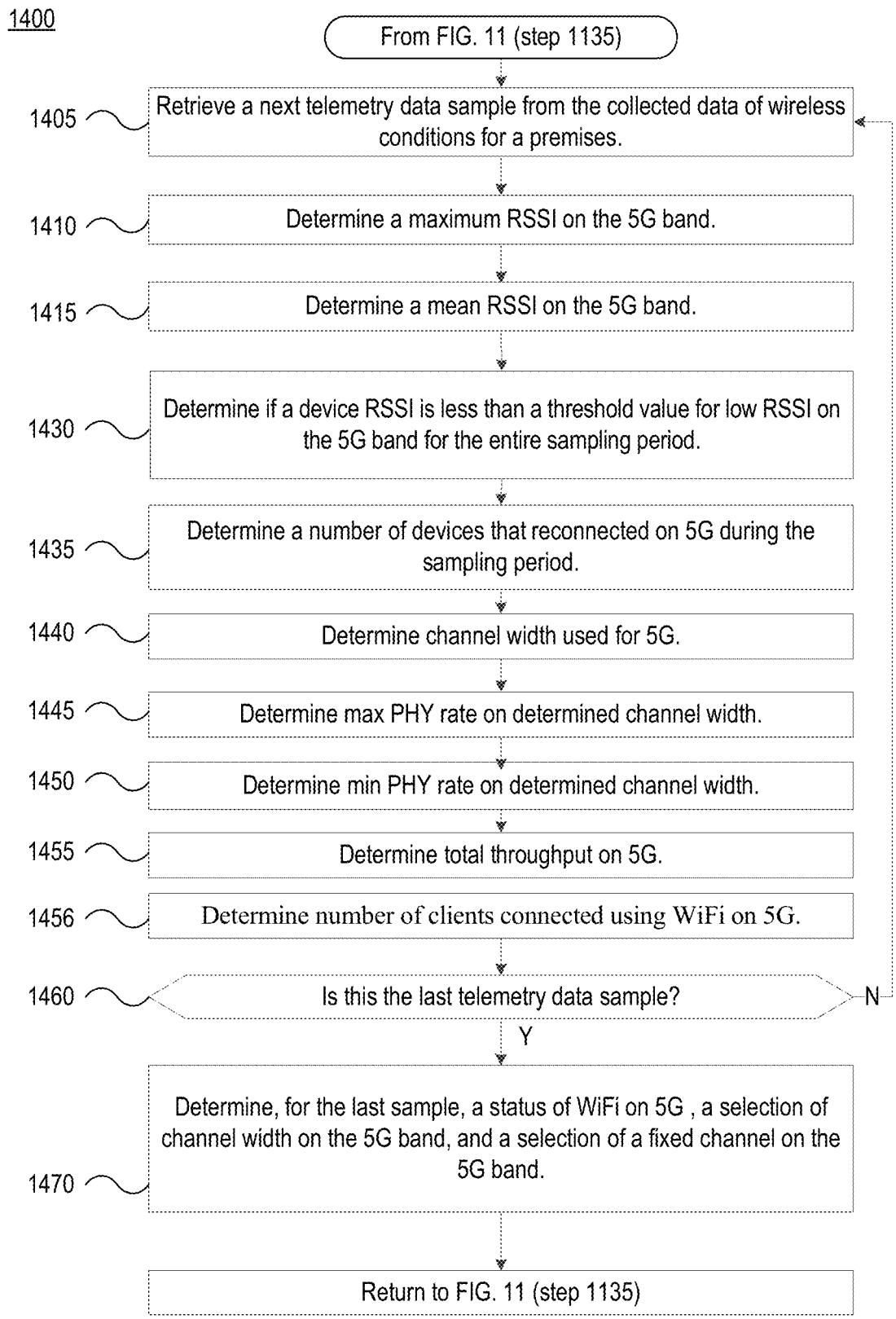
FIG. 14 shows a flow diagram of an example method for evaluating telemetry data samples to identify wireless conditions on the 5G band.
Figure 15A:
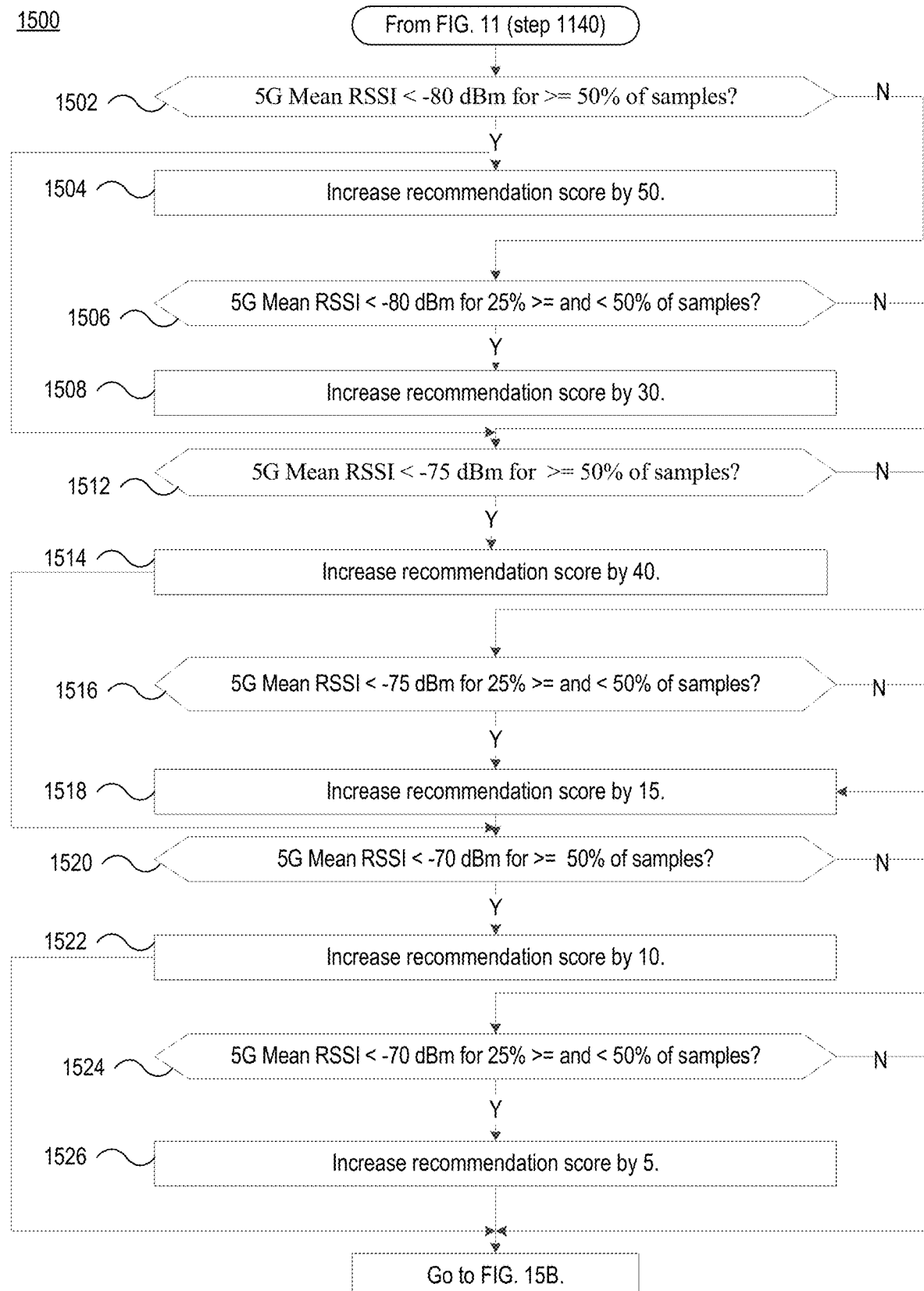
FIGS. 15A-D show flow diagrams of an example method for evaluating wireless conditions on the 5G band to determine whether to install one or more range extending computing devices.
Figure 15B:
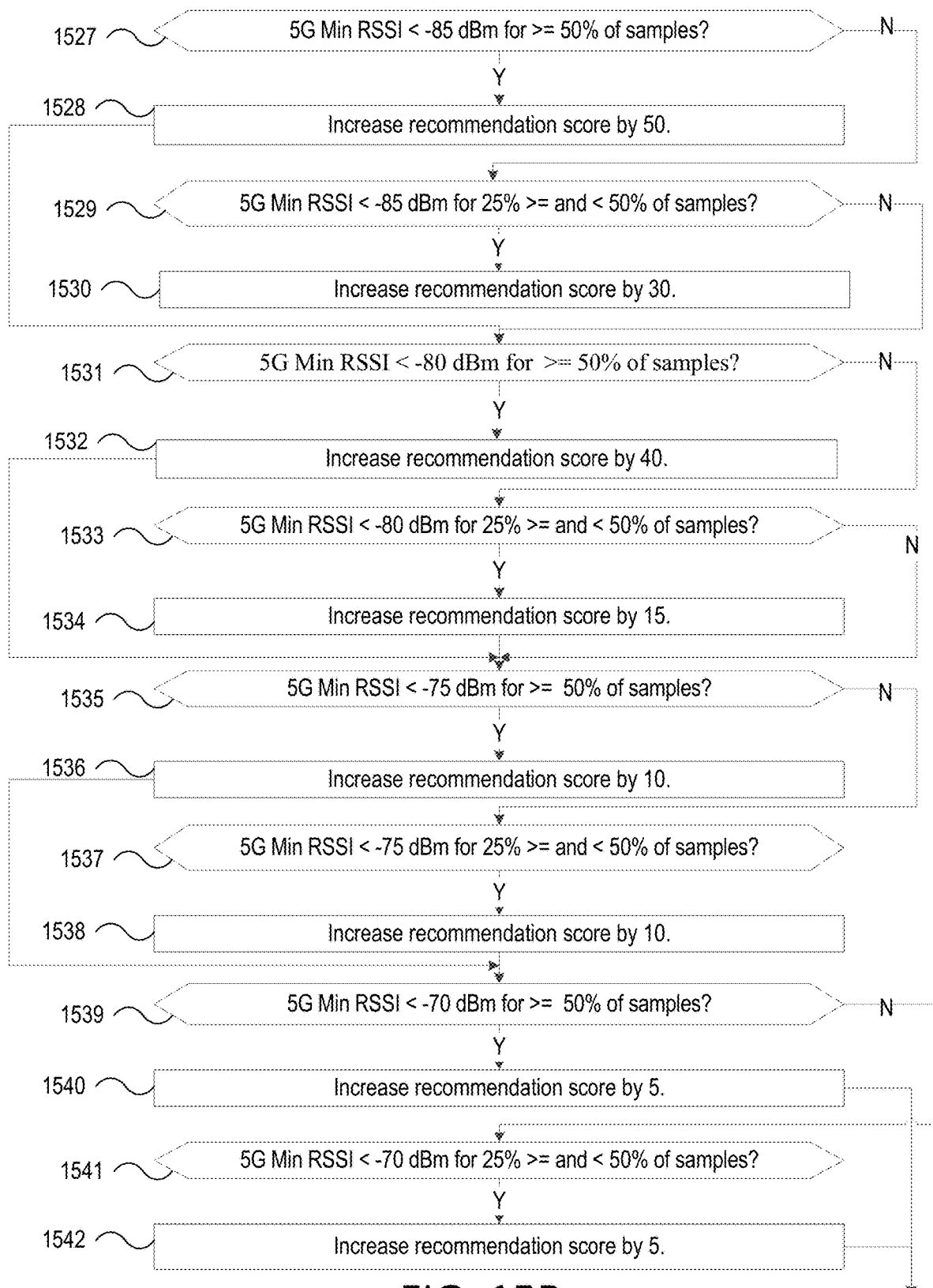
Figure 15C:
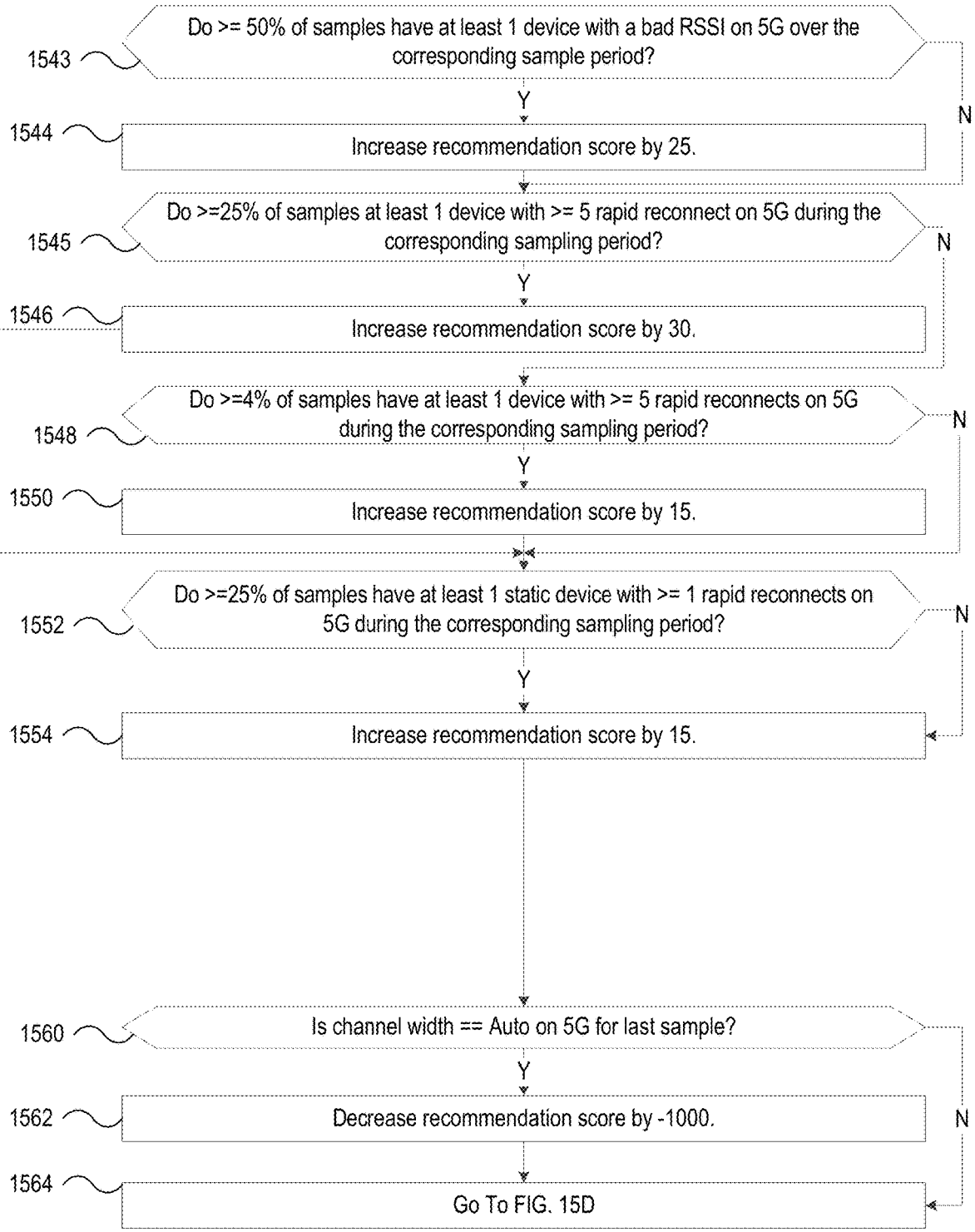
Figure 15D:
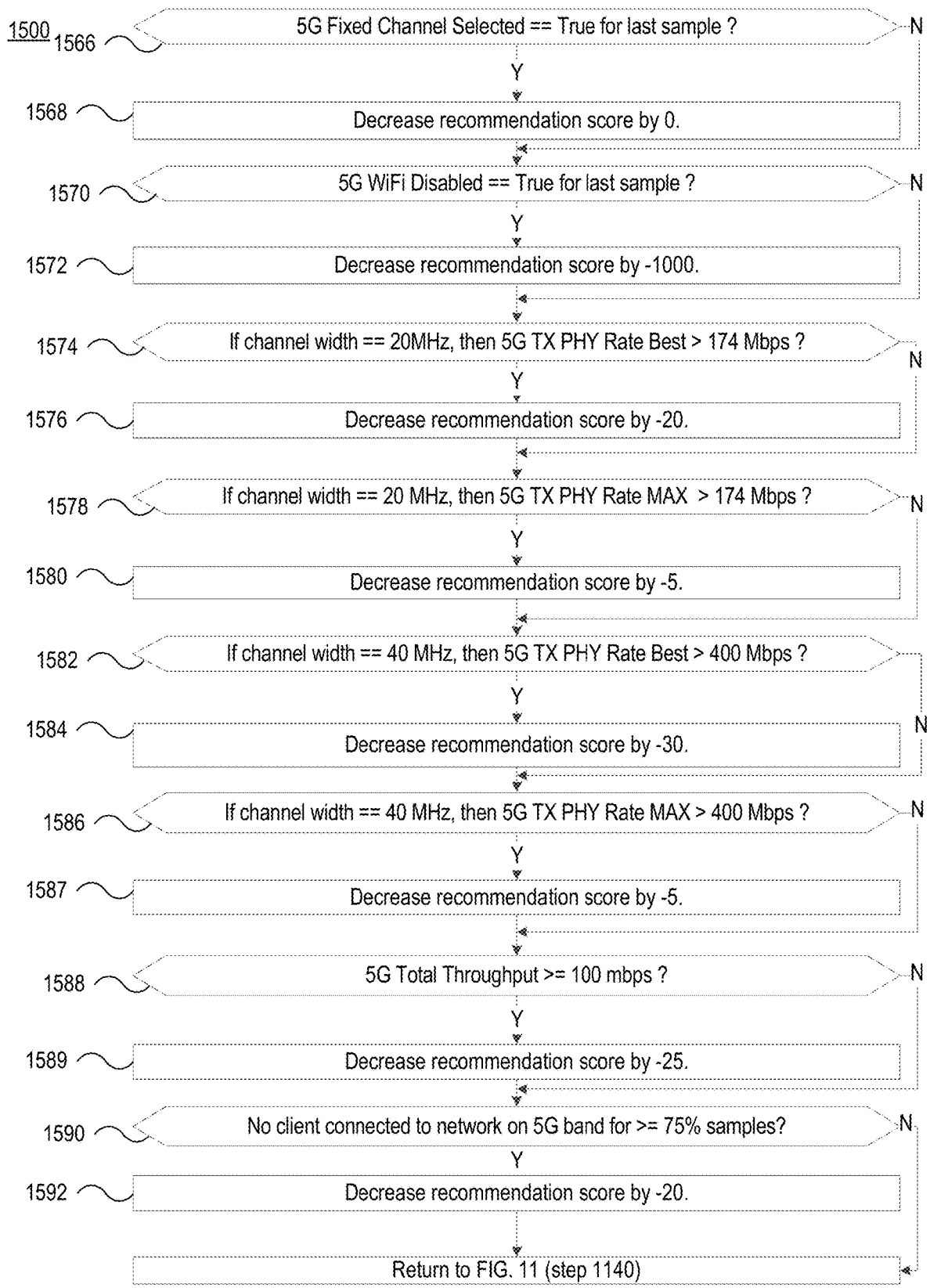

FIG. 14 shows a flow diagram of an example method 1400 for evaluating each of the telemetry data samples within the previously collected data of wireless conditions for the premises to identify wireless conditions on the 5G band that may be improved or degraded by the addition of range extending computing devices, as described above with reference to step 1135 of FIG. 11. The steps of the method 1400 may be performed by the recommendation server 122 shown in FIG. 1. Alternatively or additionally, some or all of the steps of the method 1400 may be performed by one or more other computing devices. Steps of the method 1400 may be modified, omitted, and/or performed in other orders, and/or other steps added.

At step 1405, the recommendation server 122 may retrieve a next telemetry data sample from the previously collected data of wireless conditions for the premises. At step 1410, the recommendation server 122 may evaluate the RSSI measurements in the data sample to determine a maximum RSSI value on the 5G band for the data sample. At step 1415, the recommendation server 122 may evaluate the RSSI measurements in the retrieved sample to determine a mean of the RSSI values on the 5G band. At step 1430, the recommendation server 122 may determine, a minimum amount of time during the sampling period when a signal strength (RSSI) on the 5G band associated with a device 305 is less than a threshold RSSI value set for an unacceptably low signal strength.

At step 1435, the recommendation server 122 may evaluate the data sample to determine a number of devices 305 that reconnected to the wireless network on the 5G band during the sampling period. At step 1440, the recommendation server 122 may determine a channel width utilized by the access point 310 on the 5G band during the sampling period. The channel width may be set to 20 or 40 MHz.

At step 1445, the recommendation server 122 may determine, for the retrieved data sample, the highest reported physical layer (PHY) rate (also referred to as "TX PHY Rate Best") used to transmit data on the 5G band to any device 305 on the network using the determined channel width. At step 1450, the recommendation server 122 may determine, for the retrieved data sample, the TX PHY Rate MAX reported for a device 305 when the network is using the determined channel width on the 5G band. The TX PHY Rate MAX is the highest maximum theoretical PHY rate reported for any device 305 in a data sample when the network is using the 20 MHz channel width on the 5G band.

At step 1455, the recommendation server 122 may evaluate, for the retrieved sample, a throughput of the network. The recommendation server 122 may evaluate transmission/receiver throughput values over the sampling period (or telemetry interval). At step 1456, the recommendation server 122 may determine, for the retrieved data sample, a number of devices 305 that were connected to the wireless network on the 5G band during the sampling period.

At step 1460, the recommendation server 122 may determine whether the retrieved data sample is the last data sample of the collected data. Based on determining that the retrieved data sample is not the last data sample, the recommendation server 122 may return to step 1405 and retrieve the next data sample of the collected data. The recommendation server 122 may repeat the steps 1405 through 1460 for each of the data samples in the collected data.

Based on determining that the retrieved sample is the last data sample, the recommendation server 122 may determine, at step 1470, whether WiFi on the 5G band was disabled. The recommendation server 122 may return to step 1135 of the method 1100 in FIG. 11.

FIGS. 15A-D show flow diagrams of an example method 1500 for evaluating the wireless conditions on the 5G band that were identified by method 1400 in FIG. 14 in order to determine a predicted benefit of repeaters on the overall wireless performance, as described above with reference to step 1140 of the method 1100 in FIG. 11. The steps of the method 1500 may be performed by the recommendation server 122 shown in FIG. 1. Alternatively or additionally, some or all of the steps of the method 1500 may be performed by one or more other computing devices. Steps of the method 1500 may be modified, omitted, and/or performed in other orders, and/or other steps added. The example criteria, weights, and other values described below and in connection with FIGS. 15A-15D and Tables 8-11 are not limiting. Different weights and/or other values may be used in connection with any of those example criteria. Less than all of those criteria may be used, and/or other criteria may be used.

The recommendation server 122 may evaluate the mean RSSI on the 5G band determined for the data samples in step 1415 of FIG. 14. Table 8 shows example evaluation criteria for evaluating the mean RSSI on the 5G band and their relative impact on the recommendation score.

As shown in Table 8, if the minimum RSSI on the 2.4G band is less than −85 dBm for over 50% of the data samples, a relative performance benefit of adding range extending computing devices may be represented by a weight of 50. At step 1527, the recommendation server 122 may evaluate whether at least 50% of the samples have a minimum RSSI that is less than −85 dBm. If at least 50% of the samples have a minimum RSSI that is less than −85 dBm, the recommendation server 122 may, at step 1528, increase the recommendation score based on utilizing a weight of 50.

As shown in Table 8, if the minimum RSSI on the 2.4G band is less than −85 dBm for more than at least 25% and less than 50% of the samples, a relative performance benefit of adding range extending computing devices may be represented by a weight of 30. At step 1529, the recommendation server 122 may evaluate whether at least 25% and less than 50% of the samples have a minimum RSSI that is less than −85 dBm. Based on the evaluation, the recommendation server 122 may, at step 1530, increase the recommendation score based on utilizing a weight of 30.

TABLE 8

| Criterion | Evaluation of Criterion | Weight |
| --- | --- | --- |
| 5G Mean RSSI <−80 dBm | >=50% of samples. | 50 |
| 5G Mean RSSI <−80 dBm | >=25% and <50% of samples. | 30 |
| 5G Mean RSSI <−75 dBm | >=50% of samples. | 40 |
| 5G Mean RSSI <−75 dBm | >=25% and <50% of samples. | 15 |
| 5G Mean RSSI <−70 dBm | >=50% of samples. | 10 |
| 5G Mean RSSI <−70 dBm | >=25% and <50% of samples. | 5 |

As shown in Table 8, if the mean RSSI on the 5G band is less than −80 dBm for at least 50% of the telemetry data samples, a relative performance benefit of adding range extending computing devices may be represented by a weight of 50. At step 1502, the recommendation server 122 may evaluate whether at least 50% of the samples have a mean RSSI that is less than −80 dBm. If at least 50% of the samples have a mean RSSI that is less than −80 dBm, the recommendation server 122 may, at step 1504, increase the recommendation score by utilizing the weight of 50.

As shown in Table 8, if the mean RSSI on the 5G band is less than −80 dBm for more than at least 25% and less than 50% of the samples, a relative performance benefit of adding range extending computing devices may be represented by a weight of 30. At step 1506, the recommendation server 122 may evaluate whether a at least 25% and less than 50% of the samples have a mean RSSI that is less than −80 dBm. If at least 50% of the samples have a mean RSSI that is less than −80 dBm, the recommendation server 122 may, at step 1508, increase the recommendation score by utilizing the weight of 30.

As shown in Table 8, if the mean RSSI on the 5G band is less than −75 dBm for over 50% of the data samples, a relative performance benefit of adding range extending computing devices may be represented by a weight of 40. At step 1512, the recommendation server 122 may evaluate whether at least 50% of the samples have a mean RSSI that is less than −75 dBm. If at least 50% of the samples have a mean RSSI that is less than −75 dBm, the recommendation server 122 may, at step 1514, increase the recommendation score based on utilizing a weight of 40.

As shown in Table 8, if the mean RSSI on the 5G band is less than −75 dBm for more than at least 25% and less than 50% of the samples, a relative performance benefit of adding range extending computing devices may be represented by a weight of 15. At step 1516, the recommendation server 122 may evaluate whether more than at least 25% and less than 50% of the samples have a mean RSSI that is less than −75 dBm. If at least 50% of the samples have a mean RSSI that is less than −75 dBm, the recommendation server 122 may, at step 1518, increase the recommendation score based on utilizing a weight of 15.

As shown in Table 8, if the mean RSSI on the 5G band is less than −70 dBm for over 50% of the data samples, a relative performance benefit of adding range extending computing devices may be represented by a weight of 10. At step 1520, the recommendation server 122 may evaluate whether at least 50% of the samples have a mean RSSI that is less than −70 dBm. If at least 50% of the samples have a mean RSSI that is less than −70 dBm, the recommendation server 122 may, at step 1522, increase the recommendation score based on utilizing a weight of 10.

As shown in Table 8, if the mean RSSI on the 5G band is less than −70 dBm for more than at least 25% and less than 50% of the samples, a relative performance benefit of adding range extending computing devices may be represented by a weight of 5. At step 1524, the recommendation server 122 may evaluate whether at least 25% and less than 50% of the samples have a mean RSSI that is less than −70 dBm. If more than at least 25% and less than 50% of the samples have a mean RSSI that is less than −70 dBm, the recommendation server 122 may, at step 1526, increase the recommendation score based on utilizing a weight of 5.

TABLE 9

| Criterion | Evaluation of Criterion | Weight |
| --- | --- | --- |
| 5G Min RSSI <−85 dBm | >=50% of samples. | 50 |
| 5G Min RSSI <−85 dBm | >=25% and <50% of samples. | 30 |
| 5G Min RSSI <−80 dBm | >=50% of samples. | 40 |
| 5G Min RSSI <−80 dBm | >=25% and <50% of samples. | 15 |
| 5G Min RSSI <−75 dBm | >=50% of samples. | 10 |
| 5G Min RSSI <−75 dBm | >=25% and <50% of samples. | 10 |
| 5G Min RSSI <−70 dBm | >=50% of samples. | 5 |
| 5G Min RSSI <−70 dBm | >=25% and <50% of samples. | 5 |

Table 9 shows example evaluation criteria for the minimum RSSI of the data samples on the 5G band and their relative impact on the predicted benefit or recommendation score. As shown in Table 9, if the minimum RSSI on the 5G band is less than −85 dBm for over 50% of the data samples, a relative performance benefit of adding range extending computing devices may be represented by a weight of 50. At step 1527, the recommendation server 122 may evaluate whether at least 50% of the samples have a minimum RSSI that is less than −85 dBm. If at least 50% of the samples have a minimum RSSI that is less than −85 dBm, the recommendation server 122 may, at step 1528, increase the recommendation score based on utilizing a weight of 50.

As shown in Table 9, if the minimum RSSI on the 5G band is less than −85 dBm for more than at least 25% and less than 50% of the samples, a relative performance benefit of adding range extending computing devices may be represented by a weight of 30. At step 1529, the recommendation server 122 may evaluate whether at least 25% and less than 50% of the samples have a minimum RSSI that is less than −85 dBm. Based on the evaluation, the recommendation server 122 may, at step 1530, increase the recommendation score based on utilizing a weight of 30.

As shown in Table 9, if the minimum RSSI on the 5G band is less than −80 dBm for over 50% of the data samples, a relative performance benefit of adding range extending computing devices may be represented by a weight of 40. At step 1531, the recommendation server 122 may evaluate whether at least 50% of the samples have a minimum RSSI that is less than −80 dBm. Based on the evaluation, the recommendation server 122 may, at step 1532, increase the recommendation score based on utilizing a weight of 40.

As shown in Table 9, if the minimum RSSI on the 5G band is less than −80 dBm for more than at least 25% and less than 50% of the samples, a relative performance benefit of adding range extending computing devices may be represented by a weight of 15. At step 1533, the recommendation server 122 may evaluate whether more than at least 25% and less than 50% of the samples have a minimum RSSI that is less than −80 dBm. Based on the evaluation, the recommendation server 122 may, at step 1534, increase the recommendation score based on utilizing a weight of 15.

As shown in Table 9, if the minimum RSSI on the 2.4G band is less than −75 dBm for over 50% of the data samples, adding range extending computing devices may have a negligible predicted benefit for the overall performance, and a relative performance benefit of adding range extending computing devices may be represented by a weight of 10. At step 1535, the recommendation server 122 may evaluate whether at least 50% of the samples have a minimum RSSI that is less than −75 dBm. If at least 50% of the samples have a minimum RSSI that is less than −75 dBm, the recommendation server 122 may, at step 1536, increase the recommendation score based on utilizing a weight of 10.

As shown in Table 9, if the minimum RSSI on the 5G band is less than −75 dBm for more than at least 25% and less than 50% of the samples, adding range extending computing devices may have an equally negligible benefit for the overall performance as when at least 50% of the samples have a minimum RSSI that is less than −75 dBm, and a relative performance benefit of adding range extending computing devices may be represented by a weight of 10. At step 1537, the recommendation server 122 may evaluate whether more than at least 25% and less than 50% of the samples have a minimum RSSI that is less than −75 dBm. If more than at least 25% and less than 50% of the samples have a minimum RSSI that is less than −75 dBm, the recommendation server 122 may, at step 1538, increase the recommendation score based on utilizing a weight of 10.

As shown in Table 9, if the minimum RSSI on the 5G band is less than −70 dBm for over 50% of the data samples, adding range extending computing devices may have a may have a negligible predicted benefit for the overall performance, and a relative performance benefit of adding range extending computing devices may be represented by a weight of 5. At step 1539, the recommendation server 122 may evaluate whether at least 50% of the samples have a minimum RSSI that is less than −70 dBm. If at least 50% of the samples have a minimum RSSI that is less than −70 dBm, the recommendation server 122 may, at step 1540, adjust the recommendation score based on the assigned weight of 5.

As shown in Table 9, if the minimum RSSI on the 5G band is less than −70 dBm for more than at least 25% and less than 50% of the samples, adding range extending computing devices may have an equally negligible benefit for the overall performance as when at least 50% of the samples have a minimum RSSI that is less than −70 dBm, and a relative performance benefit of adding range extending computing devices may be represented by a weight of 5. At step 1541, the recommendation server 122 may evaluate whether more than at least 25% and less than 50% of the samples have a minimum RSSI that is less than −70 dBm. If more than at least 25% and less than 50% of the samples have a minimum RSSI that is less than −70 dBm the recommendation server 122 may, at step 1542, increase the recommendation score by utilizing a weight of 5.

As discussed above, at step 1430, the recommendation server 122 may determine, for the data samples, a minimum amount of time during the corresponding sampling period when a signal strength (RSSI) on the 5G band associated with a device 305 is less than a threshold RSSI value set for an unacceptably low signal strength. Table 10 shows example evaluation criteria related to device connectivity on the 5G band and their relative impact on the recommendation score.

As shown in Table 10, if at least 50% of the samples have at least one device 305 with a RSSI less than the threshold RSSI value set for an unacceptably low signal strength on the 5G band, a relative performance benefit of adding range extending computing devices may be represented by a weight of 25. At step 1543, the recommendation server 122 may evaluate whether at least 50% of the samples have at least one device 305 with a RSSI less than the threshold RSSI value set for an unacceptably low signal strength. Based on the evaluation, the recommendation server 122 may, at step 1544, increase the recommendation score based on utilizing a weight of 25.

TABLE 10

| Criterion | Evaluation of Criterion | Weight |
| --- | --- | --- |
| 5G Min Client time in bad RSSI = Sample Time | At least 1 client has bad RSSI = telemetry sample time for >=50% of samples. | 25 |
| 5G Client Rapid Reconnects >=5 | At least 1 client has >=5 rapid reconnect events for >=25% of samples. | 30 |
| 5G Client Rapid Reconnects >=5 | At least 1 client has >=5 rapid reconnect events for >=4% of samples. | 15 |
| 5G Static Client Rapid Reconnects >=1 | At least 1 static client (requires fingerprinting) has >=1 rapid reconnect events for >=25% of samples. | 15 |

As discussed above with reference to FIG. 14, the recommendation server 122 may evaluate each data sample to determine a number of devices 305 that reconnected to the wireless network on the 5G band during the corresponding sampling period. As shown in Table 10, if at least 25% of the samples had at least one device 305 that experienced at least 5 reconnects to the network during their corresponding sampling periods, the addition of repeaters may have an overall benefit by improving the connectivity for the devices 305, and a relative performance benefit of adding range extending computing devices may be represented by a weight of 30. At step 1545, the recommendation server 122 may evaluate whether at least 25% of the data samples had at least one device 305 that experienced at least 5 reconnects to the network during the corresponding sampling periods. Based on the evaluation, the recommendation server 122 may, at step 1546, increase the recommendation score based on utilizing a weight of 30.

As shown in Table 10, if at least 4% of the samples had at least one device 305 that experienced at least 5 reconnects to the network during their corresponding sampling periods, the addition of repeaters may have an overall benefit by improving the connectivity for the devices 305, and a relative performance benefit of adding range extending computing devices may be represented by a weight of 5. At step 1548, the recommendation server 122 may evaluate whether at least 4% of the data samples had at least one device 305 that experienced at least 5 reconnects to the network during the corresponding sampling periods. Based on the evaluation, the recommendation server 122 may, at step 1550, increase the recommendation score based on utilizing a weight of 5.

As shown in Table 10, if at least 25% of the samples had at least one static device 305 that experienced at least 1 reconnect to the network during their corresponding sampling periods, the addition of repeaters may have a lesser overall benefit on performance by improving connectivity, and a relative performance benefit of adding range extending computing devices may be represented by a weight of 15. At step 1552, the recommendation server 122 may evaluate whether at least 25% of the samples have at least one static device 305 with at least one reconnect to the network during the corresponding sampling periods. Based on the evaluation, the recommendation server 122 may, at step 1554, increase the recommendation score by utilizing a weight of 15.

As discussed above, adding range extending computing devices may degrade overall performance in some cases. As described above, at step 1470 of FIG. 14, the recommendation server 122 may determine, based on the last telemetry data sample, the setting of the channel width on the 5G band, a selection of fixed channel, and a status of WiFi on the 5G band. As shown by the example criteria of Table 11, if the channel width on the 5G band was set to "Auto," the addition of repeaters may degrade the overall performance, and a relative performance benefit of adding range extending computing devices may be represented by a weight of −1000. At step 1560, the recommendation server 122 may evaluate whether the channel width on the 5G band was set to "Auto." Based on the evaluation, the recommendation server 122 may, at step 1562, alter (e.g., decrease) the recommendation score based on utilizing a weight of −1000.

If a fixed channel is selected on the 5G band, installing repeaters may disable fixed/manual channel selection and instead utilize DCS mode. As shown in Table 11, if a fixed channel is selected on the 5G band, the addition of repeaters may degrade the overall performance, and a relative performance benefit of adding range extending computing devices may be represented by a weight of −1000. At step 1566, the recommendation server 122 may evaluate whether a fixed channel is selected. Based on the evaluation, the recommendation server 122 may, at step 1568, alter (e.g., decrease) the recommendation score based on utilizing a weight of 0.

TABLE 11

| Criterion | Evaluation of Criterion | Weight |
| --- | --- | --- |
| 5G Channel width <> Auto | Last reported telemetry sample at the end of the measurement interval. | −1000 |
| 5G Fixed Channel Selected == True | Last reported telemetry sample at the end of the measurement interval. | 0 |
| 5G WiFi Disabled == True | Last reported telemetry sample at the end of the measurement interval. | −1000 |
| 5G TX PHY Rate Best(20 MHz) >174 Mbps | At least 1 occurrence detected over the measurement interval. | −20 |
| 5G TX PHY Rate MAX (20 MHz) >174 Mbps | At least 1 occurrence detected over the measurement interval. | −5 |
| 5G TX PHY Rate Best(40 MHz) >400 Mbps | At least 1 occurrence detected over the measurement interval. | −30 |
| 5G TX PHY Rate MAX (40 MHz) >400 Mbps | At least 1 occurrence detected over the measurement interval. | −5 |
| 5G Total Throughput >=100 mbps | At least 1 occurrence (true for >=10 minutes) over the measurement interval. Telemetry interval should equal 15 minutes for best results | −25 |
| No devices connected using WiFi on 5G. | >=75% of samples reported over the measurement interval. | −20 |

As shown in Table 11, if wireless on the 5G was disabled, the addition of repeaters may degrade the overall performance, and a relative performance benefit of adding range extending computing devices may be represented by a weight of −1000. At step 1570, the recommendation server 122 may evaluate whether wireless on the 5G band was disabled. Based on the evaluation, the recommendation server 122 may, at step 1572, alter (e.g., decrease) the recommendation score based on utilizing a weight of −1000.

The recommendation score may be based on an evaluation of the highest reported PHY rate (referred to as "TX PHY Rate Best") used for transmitting data to any of the devices 305 on the network using the 20 MHz channel width. As discussed above with reference to FIG. 14, at step 1445, the recommendation server 122 may determine the maximum PHY rate for the data samples on the 20 MHz or 40 MHz channel width. Although rates above the TX PHY Rate Best may be supported by the access point 310 and the devices 305, they may be unsupported by the range extending computing devices. If the repeaters do not support the TX PHY Rate Best reported in the data samples, adding repeaters may degrade the overall network performance. As shown in Table 11, if there is at least one occurrence of TX PHY Rate Best that is greater than a threshold value of 145 Mbps, the recommendation score may be decreased by a weight of −20. The threshold value may be based on the highest rate supported by the wireless repeaters. At step 1574 the recommendation server 122 may evaluate the TX PHY Rate Best of the data samples to determine whether there is at least one occurrence of TX PHY Rate Best that is greater than 145 Mbps. Based on determining that there is at least one occurrence of TX PHY Rate Best that is greater than 145 Mbps, the recommendation server, at step 1376 may decrease the recommendation score by utilizing a weight of −20.

The recommendation score may be based on an evaluation of the highest reported PHY rate (referred to as "TX PHY Rate MAX") used for transmitting data to any of the devices 305 on the network using the 20 MHz channel width. As discussed above with reference to FIG. 14, at step 1445, the recommendation server 122 may determine the maximum PHY rate for the data samples on the 20 MHz or 40 MHz channel width. Although rates above the TX PHY Rate MAX may be supported by the access point 310 and the devices 305, they may be unsupported by the range extending computing devices. If the repeaters do not support the TX PHY Rate MAX reported in the data samples, adding repeaters may degrade the overall network performance. As shown in Table 11, if there is at least one occurrence of TX PHY Rate Best that is greater than a threshold value of 174 Mbps, the recommendation score may be decreased by a weight of −5. The threshold value may be based on the highest rate supported by the range extending computing devices. At step 1578 the recommendation server 122 may evaluate the TX PHY Rate MAX for the data samples on the 20 MHz channel to determine whether there is at least one occurrence of TX PHY Rate MAX that is greater than 174 Mbps. Based on determining that there is at least one occurrence of TX PHY Rate MAX that is greater than 174 Mbps, the recommendation server, at step 1576 may decrease the recommendation score by utilizing a weight of −5.

As shown in Table 11, if there is at least one occurrence of TX PHY Rate Best that is greater than a threshold value of 145 Mbps, the recommendation score may be decreased by a weight of −20. The threshold value may be based on the highest rate supported by the range extending computing devices. At step 1580 the recommendation server 122 may evaluate the TX PHY Rate Best of the data samples to determine whether there is at least one occurrence of TX PHY Rate Best that is greater than 174 Mbps. Based on determining that there is at least one occurrence of TX PHY Rate Best that is greater than 145 Mbps, the recommendation server, at step 1582 may decrease the recommendation score by utilizing a weight of −20.

As shown in Table 11, if there is at least one occurrence of TX PHY Rate MAX that is greater than a threshold value of 400 Mbps, the recommendation score may be decreased by a weight of −5. The threshold value may be based on the highest rate supported by the range extending computing devices on the 40 MHz channel of the 5G band. At step 1584 the recommendation server 122 may evaluate the TX PHY Rate MAX for the data samples on the 20 MHz channel to determine whether there is at least one occurrence of TX PHY Rate MAX that is greater than 400 Mbps. Based on determining that there is at least one occurrence of TX PHY Rate MAX that is greater than 400 Mbps, the recommendation server, at step 1586 may decrease the recommendation score by utilizing a weight of −5.

The recommendation score may be based on an evaluation of the total throughput for the network reported in the data samples. Transmission/receiver throughput values that are greater than or equal to 100 Mbps may be difficult or unlikely to be supported by range extending computing devices, especially on 2.4G backhaul links. As shown in Table 11, if there is at least one occurrence of TX PHY Rate MAX that is greater than a threshold value of 400 Mbps, the recommendation score may be decreased by a weight of −5. The sample time of the data sample should be at least 15 minutes. At step 1588, the recommendation server 122 may evaluate the total throughput on the 5G band determined for the data samples in FIG. 14. Based on determining that there is at least one occurrence of total throughput that is greater than or equal to 400 Mbps, the recommendation server may, at step 1589, decrease the recommendation score by utilizing a weight of −25.

The recommendation score may be based on a number of devices 305 that were connected to the network on the 5G band. As discussed above with reference to FIG. 14, at step 1456 of the method 1400, the recommendation server 122 may determine, for the retrieved data sample, a number of devices 305 that were connected to the wireless network on the 5G band during the sampling period. As shown in Table 11, no devices 305 were connected to the network on the 5G band for at least 75% of the data samples, the recommendation score may be decreased by a weight of −20. At step 1590, the recommendation server 122 may evaluate whether there were no devices 305 connected to the network on the 5G band for at least 75% of the data samples. Based on the evaluation, the recommendation server 122 may, at step 1392, decrease the recommendation score by utilizing a weight of −20, and the recommendation server 122 may return to step 1145 of FIG. 11.

The recommendation score may be determined based on prioritizing one or more devices 305 or device connectivity. The recommendation score may be determined for user specified wireless networks at the premises. The recommendation score may be determined based on one or more of the devices 305 that are specified by the user. The one or more devices 305 may be specified based on group, device type or device version. The recommendation score may be determined based on excluding or including one or more devices 305 based on factors associated with a device reliability or latency.

A machine learning algorithm may be trained on the wireless conditions data collected from multiple other premises to analyze the wireless conditions for a particular premises and provide recommendations. In some examples, data collected across various similar form factor premises may be analyzed to discover previous patterns and Wi-Fi extender placements that may also be useful for providing recommendations on installing range extending computing devices. For example, one or more steps of FIGS. 15A-D may be performed by a machine learning system based on reinforcement/bandit algorithms that may provide recommendation scores such that one or more indicators of customer satisfaction are optimized.

The recommendation server 122 may determine the recommendation score indicating how much the home would benefit by addition of range extending computing devices. The score may comprise a value between 0 and 100. A score of 100 may indicate that based on the evaluation of the wireless conditions, there may be a substantial benefit, from wireless repeater installation. A score of 0 may indicate that, based on the evaluation of the wireless conditions, there may be no benefit from wireless repeater installation. A score of 0 may also indicate that the user's wireless network settings are not compatible with range extending computing devices and/or that installation of repeaters may degrade the wireless conditions in the home more than connecting directly to the access point. At step 1155, the recommendation server 122 may provide the indication of whether to install range extending computing devices to a call center, customer service center, or service provider. The recommendation server 122 may provide the indication directly the customer or user associated with the premises via the access point 310, or a mobile application or web browser executing on a user device. At step 1160, based on a recommendation to install range extending computing devices, one or more range extending computing devices may be sent to the customer associated with the premises.

The placement of range extending computing devices may affect their ability to extend the range of existing wireless signals. As discussed above, in some cases, the access point may be restricted to an area of the premises and thus, may not be moved into a potentially optimal location. At some point the wireless signal may be weaker at large distances from the access point. A wireless repeater placed well within the reach of the access point's signal reach may allow the repeater to extend the signal beyond the reach of the access point and provide coverage to previously low coverage areas. At a potentially optimal placement, a wireless repeater may receive a strong signal from the access point and is therefore, able to extend the signal beyond the reach of the access point. The customer may place the range extending computing devices at specific locations throughout the premises and utilize an application executing on a user device to evaluate the signal strengths.

Figure 16:
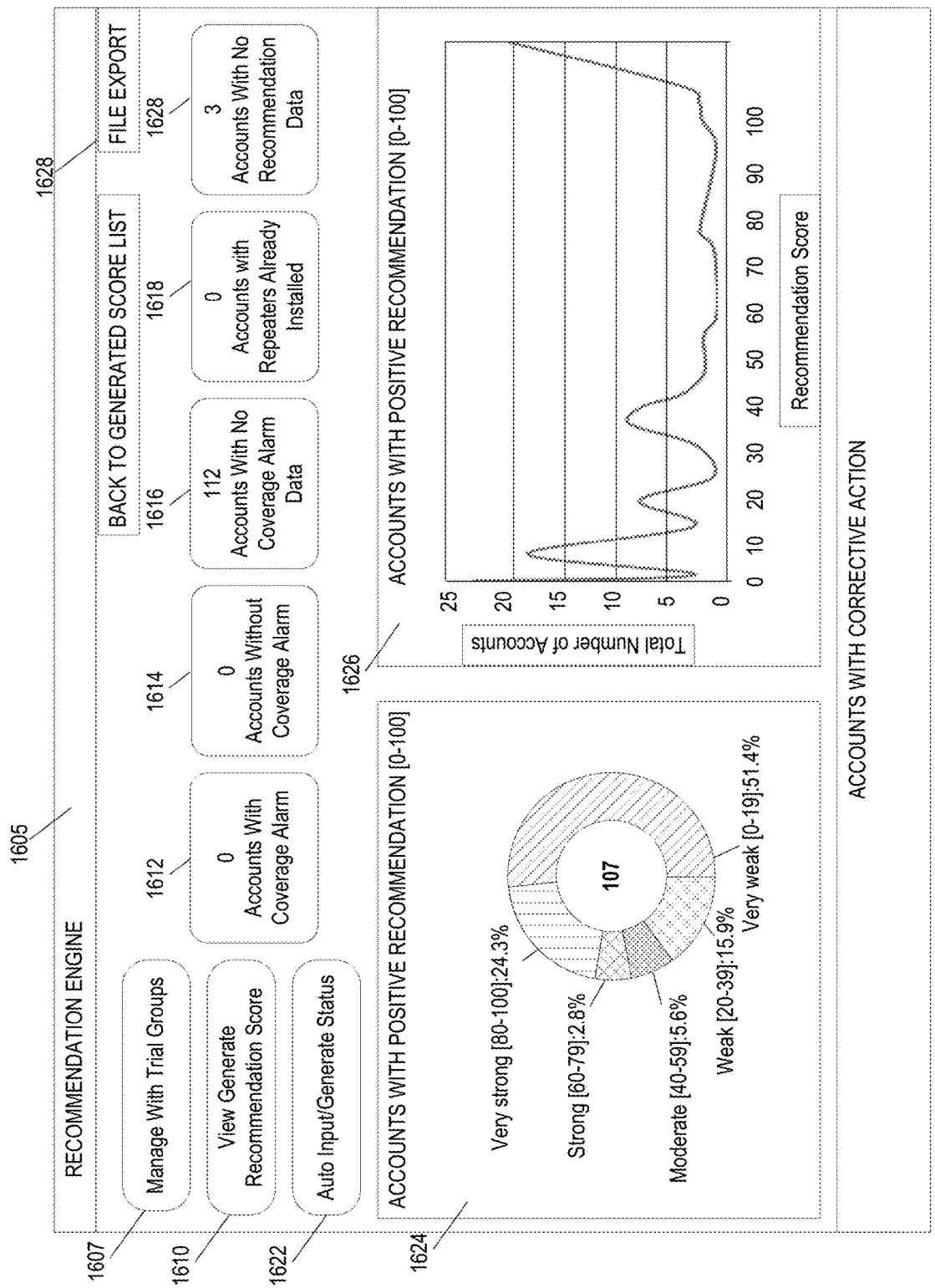
FIG. 16 shows an example user interface.

The recommendation server 122 may provide a user interface for evaluating wireless performance for a premises. FIG. 16 shows an example user interface 1605 that may be provided to a customer service center for visualizing the recommendation scores for various homes and the factors affecting the recommendation scores. Remote evaluation of wireless conditions may be performed by the recommendation server 122 for different homes, as described above with reference to FIGS. 11-15. Homes that are the best candidates for range extending computing devices, the worst candidates for range extending computing devices, and candidates with mid-range conditions that may or may not see a noticeable benefit from range extending computing devices may be identified in the user interface 1605 using different colors. The best candidates may be identified by recommendation scores that are greater than or equal to a first threshold. The worst candidates may be identified by recommendation scores that are less than or equal to a second threshold. Homes that may or may not see a noticeable benefit from range extending computing devices and may be identified by recommendation scores that are between the first and second thresholds.

Specific actionable recommendations may be provided for improving the wireless performance in each home. To determine each recommendation, the recommendation server 122 may evaluate individual wireless networks for conditions that may be favorable or un-favorable for a specific recommendation as described above with reference to FIGS. 11-15. The recommendation server 122 may determine a recommendation score per home that indicates how much the home would benefit by addition of range extending computing devices. The score may comprise a value between 0 and 100. A score of 100 for a home may indicate that based on the evaluation of the wireless conditions for the home, there may be a substantial benefit, in comparison to other homes, from wireless repeater installation. A lower recommendation score for a home may indicate a smaller predicted performance benefit for the home from the recommendation. A low recommendation score may also indicate that the recommendation, if implemented, may be detrimental to the home's wireless network. A score of 0 for a home may indicate that, relative to other homes, based on the evaluation of the wireless conditions for the home, the home would benefit the least from wireless repeater installation. A score of 0 for a home may also indicate that the user's wireless network settings are not compatible with range extending computing devices and/or that installation of repeaters may degrade the wireless conditions in the home more than connecting directly to the access point.

The user interface may comprise various dashboards for configuring a recommendation engine, executing the recommendation engine for groups of customers, and visualizing the output of that recommendation engine. Multiple recommendation scores, each corresponding to a different recommendation, may be determined and provided for each home. An example recommendation may be a recommendation of whether to install range extending computing devices, however, other recommendations may also be provided. The recommendation may utilize a cloud based process and data collected from devices in the home to calculate a score that predicts which homes would benefit the most or the least from wireless repeater installation.

The user interface 1605 may comprise various dashboard tabs related to the determination of a recommendation for installing range extending computing devices. A dashboard tab may be utilized to evaluate the wireless conditions for a home. Within this dashboard, various filters may be selected to for the evaluation of individual wireless networks by group, device type and device version filters. Another dashboard tab may be utilized for analyzing the recommendation for wireless repeater installation. A set of device MAC addresses may be specified. For example, devices in a specific group using a specific access point or gateway may be specified using their MAC addresses. Based on this selection, the number of wireless networks selected and an estimate of how long the calculation will take may be displayed in the user interface 1605. Data related to the evaluation may be exported. The user may select "File Export" 1628 in the user interface 1605 and a path and file name for the exported data. A panel within a dashboard may show a histogram view of the data utilizing recommendation score bands or recommendation colors. The histogram view may show the number or percentage of wireless networks in each score band or color. Another panel with a dashboard may enable the user to select individual wireless networks in a home and show the recommendation score and the positive/negative factors that affected the score.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving first data indicating a plurality of directions, relative to an access point, of signals associated with a plurality of wireless communications received by the access point from a plurality of devices associated with a wireless network; and
sending, by a computing device and based on the first data indicating the plurality of directions and second data indicating performance of the wireless network based on a change of location of the access point, an indication of an addition, to the wireless network, of one or more range extending computing devices, different from the access point, that is expected to improve performance of the wireless network.

2. The method of claim 1, further comprising determining, based on one or more clusterings of directions within the plurality of directions, relative to the access point, of the signals, that the change of location of the access point is expected to improve performance of the wireless network for one or more of the plurality of devices.

3. The method of claim 2, further comprising:
determining each of the one or more clusterings of directions by determining a plurality of signals having angle of arrival (AoA) measurements that are within a threshold quantity of degrees from a reference AoA for that clustering.

4. The method of claim 1, further comprising comparing the first data to data indicating patterns of directions of wireless communications, received by other access points, that are indicative of optimal access point placement.

5. The method of claim 1, wherein the first data comprises at least one of:
a plurality of angle of arrival (AoA) measurements for signals associated with the wireless communications, or
the plurality of directions, relative to the access point, of the signals, associated with the wireless communications, that were received by the access point during a predetermined period of time.

6. The method of claim 1, wherein the sending the indication comprises sending the indication via the access point to a user device.

7. The method of claim 1, further comprising:
determining, based on additional data, that the addition of the one or more range extending computing devices is expected to improve performance of the wireless network for one or more of the plurality of devices,
wherein, during the determining, the one or more range extending computing devices are not connected to the wireless network.

8. The method of claim 1, wherein the sending the indication is based on evaluating telemetry data samples collected for the wireless network.

9. The method of claim 1, wherein the indication comprises at least one of:
a relative score indicative of an expected improvement to wireless performance of the wireless network,
an indication of whether to install the one or more range extending computing devices, or
an evaluation of a placement of the one or more range extending computing devices relative to one or more of the plurality of devices.

10. The method of claim 1, wherein the access point comprises the computing device.

11. The method of claim 1, further comprising:
determining, based on a statistical variation of directions within the plurality of directions relative to the access point, of the signals, that a current location of the access point deviates from an optimal location; and
based on the determination that the current location of the access point deviates from the optimal location, sending a notification recommending to change the location of the access point.

12. The method of claim 1, further comprising:
determining, based on a quantity and a type of the plurality of devices associated with the plurality of wireless communications, that the change of location of the access point is expected to improve performance of the wireless network for one or more of the plurality of devices.

13. A method comprising:
determining, based on analyzing data associated with a plurality of access points located at a plurality of different premises, a threshold;
based on data indicating that the threshold is satisfied by a plurality of directions, relative to an access point, of signals that are received at the access point from a plurality of wireless devices, receiving, by a computing device, information indicating that changing a location of the access point is expected to improve performance of a wireless network; and
sending, to a user device and based on the information, a message associated with changing the location of the access point.

14. The method of claim 13, wherein the received information indicates, based on a concentration of directions, of the plurality of directions, relative to the access point, of the signals, that are contained in a volume converging on the access point, that changing the location of the access point is expected to improve performance of the wireless network.

15. The method of claim 13, wherein the data indicating that the threshold is satisfied comprises a plurality of angle of arrival (AoA) measurements associated with the signals.

16. The method of claim 13, further comprising determining, after changing the location of the access point and based on additional data, that an addition of one or more range extending computing devices is expected to improve performance of the wireless network.

17. The method of claim 13, further comprising:
sending, by the computing device, the data indicating that the threshold is satisfied, wherein the receiving the information is in response to the sending.

18. The method of claim 13, wherein the analyzing the data associated with the plurality of access points located at the plurality of different premises comprises analyzing statistical variations of signal directions associated with wireless communications received at the plurality of access points located at the plurality of different premises.

19. The method of claim 13, further comprising receiving, by the computing device and from each premises of the plurality of different premises, data associated with an access point located at the premises.

20. A method comprising:
- receiving, by a computing device, data comprising indications of directions, relative to an access point, of signals that are received by the access point of a wireless network associated with a premises;
- determining, based on the data, that moving the access point is not expected to improve performance of the wireless network for one or more devices associated with the wireless network;
- determining, based on additional data, an expected increase in performance of the wireless network after an addition of one or more range extending computing devices configured to communicate signals between the access point and the one or more devices associated with the wireless network; and
- sending, based on the determining the expected increase in performance of the wireless network, an indication associated with the addition of one or more range extending computing devices.

21. The method of claim 20, wherein the additional data comprises a plurality of telemetry data samples collected for the wireless network, and
wherein the determining the expected increase in performance comprises evaluating the plurality of telemetry data samples collected for the wireless network.

22. The method of claim 20, wherein the additional data comprises at least one of a mean received signal strength indicator (RSSI), a minimum RSSI, reconnection event associated with one or more wireless devices, a plurality of physical layer (PHY) rates associated with one or more wireless devices, a total throughput, or a highest PHY rate used for transmitting data to one or more wireless devices.

23. The method of claim 20, wherein the determining that moving the access point is not expected to improve performance of the wireless network is based on evaluating a statistical variation of a distribution of the directions of the signals.

24. The method of claim 20, wherein the data comprising the indications of the directions, relative to the access point, of the signals comprises a plurality of angle of arrival (AoA) measurements associated with the signals.

25. The method of claim 20, wherein the sending comprises sending the indication, associated with the addition of the one or more range extending computing devices, via the access point and to a user device.

26. The method of claim 20, wherein the determining the expected increase in performance of the wireless network comprises evaluating a plurality of telemetry data samples collected for multiple bands of the wireless network.

27. The method of claim 20, wherein the one or more range extending computing devices do not comprise the access point.

28. The method of claim 20, wherein the determining the expected increase in performance of the wireless network after the addition of one or more range extending computing devices comprises analyzing the additional data to determine the expected increase in performance, and
wherein, during the analyzing, the one or more range extending computing devices are not connected to the wireless network.

29. The method of claim 20, wherein the determining that moving the access point is not expected to improve performance of the wireless network and determining the expected increase in performance of the wireless network after the addition of one or more range extending computing devices are not based on an analysis of data associated with a current location of any of the one or more range extending computing devices.

* * * * *

UNITED STATES PATENT AND TRADEMARK OFFICE
CERTIFICATE OF CORRECTION

| | | |
|---|---|---|
| PATENT NO. | : 11,743,738 B2 | Page 1 of 1 |
| APPLICATION NO. | : 16/810356 | |
| DATED | : August 29, 2023 | |
| INVENTOR(S) | : Moreman et al. | |

It is certified that error appears in the above-identified patent and that said Letters Patent is hereby corrected as shown below:

In the Specification

Column 8, Line 45:
Delete "535" and insert --435--

In the Claims

Claim 11, Column 42, Line 18:
After "directions", insert --,--

Signed and Sealed this
Eighth Day of October, 2024

Katherine Kelly Vidal
*Director of the United States Patent and Trademark Office*